(12) United States Patent
Ross

(10) Patent No.: US 8,161,064 B2
(45) Date of Patent: Apr. 17, 2012

(54) SYSTEM FOR SEARCHING NETWORK ACCESSIBLE DATA SETS

(75) Inventor: Laurence Ross, Oldwick, NJ (US)

(73) Assignee: LSR Technologies, Oldwick, NJ (US)

( * ) Notice: Subject to any disclaimer, the term of this patent is extended or adjusted under 35 U.S.C. 154(b) by 0 days.

(21) Appl. No.: 12/624,866

(22) Filed: Nov. 24, 2009

(65) Prior Publication Data

US 2010/0070493 A1    Mar. 18, 2010

Related U.S. Application Data

(63) Continuation of application No. 12/184,882, filed on Aug. 1, 2008, now abandoned, which is a continuation-in-part of application No. 11/620,847, filed on Jan. 8, 2007, now Pat. No. 7,424,471.

(51) Int. Cl.
*G06F 17/30* (2006.01)

(52) U.S. Cl. ........................................ 707/766; 707/705

(58) Field of Classification Search .................. 707/705, 707/765, 766
See application file for complete search history.

(56) References Cited

U.S. PATENT DOCUMENTS

| | | | |
|---|---|---|---|
| 5,157,783 A | 10/1992 | Anderson et al. | |
| 5,649,186 A | 7/1997 | Ferguson | |
| 5,715,443 A | 2/1998 | Yanagihara et al. | |
| 5,951,640 A | 9/1999 | Laura | |
| 5,978,799 A | 11/1999 | Hirsch | |
| 5,983,227 A | 11/1999 | Nazem et al. | |
| 6,029,175 A | 2/2000 | Chow et al. | |
| 6,173,284 B1 | 1/2001 | Brown | |
| 6,185,614 B1 | 2/2001 | Cuomo et al. | |
| 6,292,835 B1 | 9/2001 | Huang et al. | |
| 6,298,307 B1 | 10/2001 | Murphy et al. | |
| 6,304,850 B1 | 10/2001 | Keller et al. | |
| 6,336,116 B1 | 1/2002 | Brown et al. | |
| 6,344,855 B1 | 2/2002 | Fisher et al. | |
| 6,633,867 B1 | 10/2003 | Kraft et al. | |
| 6,654,749 B1 | 11/2003 | Nashed | |
| 6,745,180 B2 | 6/2004 | Yamanoue | |

(Continued)

FOREIGN PATENT DOCUMENTS

EP    1006462 A2    6/2000

(Continued)

OTHER PUBLICATIONS

Dialog Online Courses: Setting up a Trademark Watch, pp. 1-6 [online] [retrieved on Sep. 21, 2007] Retrieved from the Internet: URL: http://training.dialog.com/onlinecourses/trademarks/lesson6/tm6-02.html.

(Continued)

*Primary Examiner* — Khanh Pham
(74) *Attorney, Agent, or Firm* — Keith D. Nowak; Carter Ledyard & Milburn LLP

(57) ABSTRACT

A Sales-Chip Relevance Alert extends the capability of the regenerating search engine by allowing users to become informed about relevant information that has changed to a second query or search request that is run after a first query or search request. The user can narrowly and specifically describe with a high degree of precision what is relevant and meaningful to the user and how the user is notified. The Alert provides a timely notice to the user about the relevant information change through user-defined means and user defined messages.

16 Claims, 28 Drawing Sheets

U.S. PATENT DOCUMENTS

| | | |
|---|---|---|
| 6,763,393 B2 | 7/2004 | Hirosawa et al. |
| 6,791,586 B2 | 9/2004 | Baker |
| 6,834,276 B1 | 12/2004 | Jensen et al. |
| 6,957,390 B2 | 10/2005 | Tamir et al. |
| 7,058,726 B1 | 6/2006 | Osaku et al. |
| 7,076,484 B2 | 7/2006 | Dworkis et al. |
| 7,080,070 B1 | 7/2006 | Gavarini |
| 7,082,476 B1 | 7/2006 | Cohen et al. |
| 7,120,628 B1 | 10/2006 | Conmy et al. |
| 7,120,862 B1 | 10/2006 | Ong |
| 7,143,118 B2 | 11/2006 | Eichstaedt et al. |
| 7,152,058 B2 | 12/2006 | Shotton et al. |
| 7,177,818 B2 | 2/2007 | Nair |
| 7,185,002 B1 | 2/2007 | Allen et al. |
| 7,185,272 B2 | 2/2007 | Pearce et al. |
| 7,197,508 B1 | 3/2007 | Brown |
| 7,225,195 B2 | 5/2007 | Avrahami et al. |
| 7,269,642 B2 | 9/2007 | Mathews |
| 7,296,062 B2 | 11/2007 | Bengi et al. |
| 7,346,630 B2 | 3/2008 | Eichstaedt et al. |
| 7,398,261 B2 | 7/2008 | Spivack et al. |
| 2002/0133381 A1 | 9/2002 | Tso |
| 2003/0055914 A1 | 3/2003 | Tanaka |
| 2004/0002961 A1* | 1/2004 | Dettinger et al. ............. 707/3 |
| 2004/0210828 A1 | 10/2004 | Langer |
| 2005/0182828 A1 | 8/2005 | Lamkin et al. |
| 2006/0206469 A1 | 9/2006 | Brown et al. |
| 2006/0224938 A1 | 10/2006 | Fikes et al. |
| 2006/0242131 A1 | 10/2006 | Okabe et al. |
| 2007/0047701 A1 | 3/2007 | Morris |
| 2007/0214095 A1 | 9/2007 | Adams et al. |

FOREIGN PATENT DOCUMENTS

| | | | |
|---|---|---|---|
| EP | 1006463 A2 | 6/2000 | |

OTHER PUBLICATIONS

Shafer, Keith, Weibel, Stuart, Jul, Erik and Fausey, Jon, Introduction to Persistent Uniform Resource Locators, OCLC Online Computer Library Center, Inc., 2007, pp. 1-6, Ohio, USA [online], [retrieved on Apr. 2, 2007 at http:www.isoc.org/isoc/whatis/conferences/inet/96/proceedings/a4/a4_1.htm] URL Updated. Retrieved from the Internet: http://www.isoc.org/inet96/proceedings/a4/a4_1.htm.

* cited by examiner

Fig. 1

SALES-FAX NEWS

| Home | Headlines | Issue | Power Search | Help | My Sales-Fax |

Quick Start Menu ▼    Keyword/Phrase [      ] [Search]
                     Current Issue○ Last months ○ Enter site○

Subscriber: willm@sales-fax.com

Your Sales Chip has been saved! You can use your Contact Manager in the following ways!

- Cut and paste this URL into your Contact Manager: http://www.sales-fax.com/cgi-bin/sflist2.pl?act=scr&scid=3166 —— 403
- Save your SalesChip as an HTML attachment.
  - Right click on this URL ⎫
  - Select 'Save Target As' a Save As; dialog box will appear with the file name pre-filled ⎬ 404
  - Specify a file name that you want and make sure that Save As Type is HTML Document ⎪
  - Click 'Save' to save the file to your harddrive in the directory of your choice ⎭

Use This Link to Save (Bookmark) This Page/Search SALES-FAX.com / Help

SALES-FAX is a TradeMark of AD-FAX Media Marketing, Inc. Copyright 2006 All rights reserved. Utilization by anyone other then the subscriber's sales or marketing personnel (and identified through public notice of rates or publication) for any purpose, or reproduction of this publication, in any form, or by any means whatsoever, is expressly prohibited without written permission. This includes, but is not limited to, photocopying, electronic, mechanical, recording or storage in any information management system for storage and retrieval. Please refer to the Subscription Agreement for more information Steps 2,3,4) when the user chooses "Save Target As" the Handler Serches for the unique identifier and directs the script "sflist2.htm" to a folder designated by the user

SALES-FAX NEWS

| Home | Headlines | Issue | ▾Power Search | Help | My Sales-Fax |

Keyword/Phrase [_____] [Search]
Current Issue ○ Last months ○ Enter site⊙

Subscriber: willm@sales-fax.com

Quick Facts
7 Articles Found for Nissan

Enter Title Here if You Wish to Save These Results | Save SalesChip                                                                                      Help

| Advertiser | Location | Agency | Location | Category | Date |
|---|---|---|---|---|---|
| ☐ Nissan North America Inc. | TN Nashville | TBWA Chiat/Day | Ca Los Angeles | AUTOMOTIVE-IMPORTED | 12/04/2006 |

Current Issue|Quick-Acts |News In Brief | Contacts & Planning|All The News|Sales Chip|E-Purpose
Brand: INFINTI G
Opportunity MKts: National
Target(s): Adult, 32 50; Skew Male, Avg HHI: $75M
Media Mix: Nat'l Cable, Internet (banners and search) and Nat'l Magazines.
Planning: 9-12 months in advance NOW (Dec) for 3Q 2007.
Opportunistic Funds: Occasionally available.                                                  702
Merchandising: Infiniti is partnering with WIRED magazine and the AskMeNow mobile phone text information service. The promotion allows those who make a weekend purchase at a WIRED store to get a free ride to their next destination in Manhattan. INTERNET: www.Infiniti.com and www.nissanusa.com.

| ☐ Nissan North America Inc. | TN Nashville | TBWA Chiat/Day | Ca Los Angeles | AUTOMOTIVE-IMPORTED | 11/01/2006 |

Analyse  | Quick-Facts |News In Brief | Contacts & Planning|All The News|Sales Chip|E-Purpose
Brand: NISSAN SENTRA
Opportunity MKts: National, Outdoor, AZ (Phoenix); CA (Los Angeles, San Francisco/Oakland/San Jose); GA (Atlanta); IL (Chicago); MA (Boston); MI (Detroit); NY (New York); PA (Philadelphia); TX Dallas/Ft Worth); Washington, DC.
Target(s): Adult, 25-54; Skew heavily to Men;, Avg HHI: $50M
Media Mix: Network TV, Nat'l Cable; Internet (banners and search engines), Outdoor, Nat'l Newspaper and Nat'l Magazines.
Planning: NOW and Ongoing
Opportunistic Funds: Occasionally available.
Merchandising: Nissan sponsors the international PGA Tour INTERNET www.nissan-usa.com.

Note: The Critical difference between a saved book mark and a Sales-Chip is the ability of Sales-Chip completely refresh itself. I.e. A bookmark saved via target link returns o the date on which it was saved. Sales-Chip can re-run the saved query in the moment it is clicked to activate from any Web-friendly field. Bookmarks cannot deliver fresh results outside of the browser. If saved to a file,

*FIG. 7*

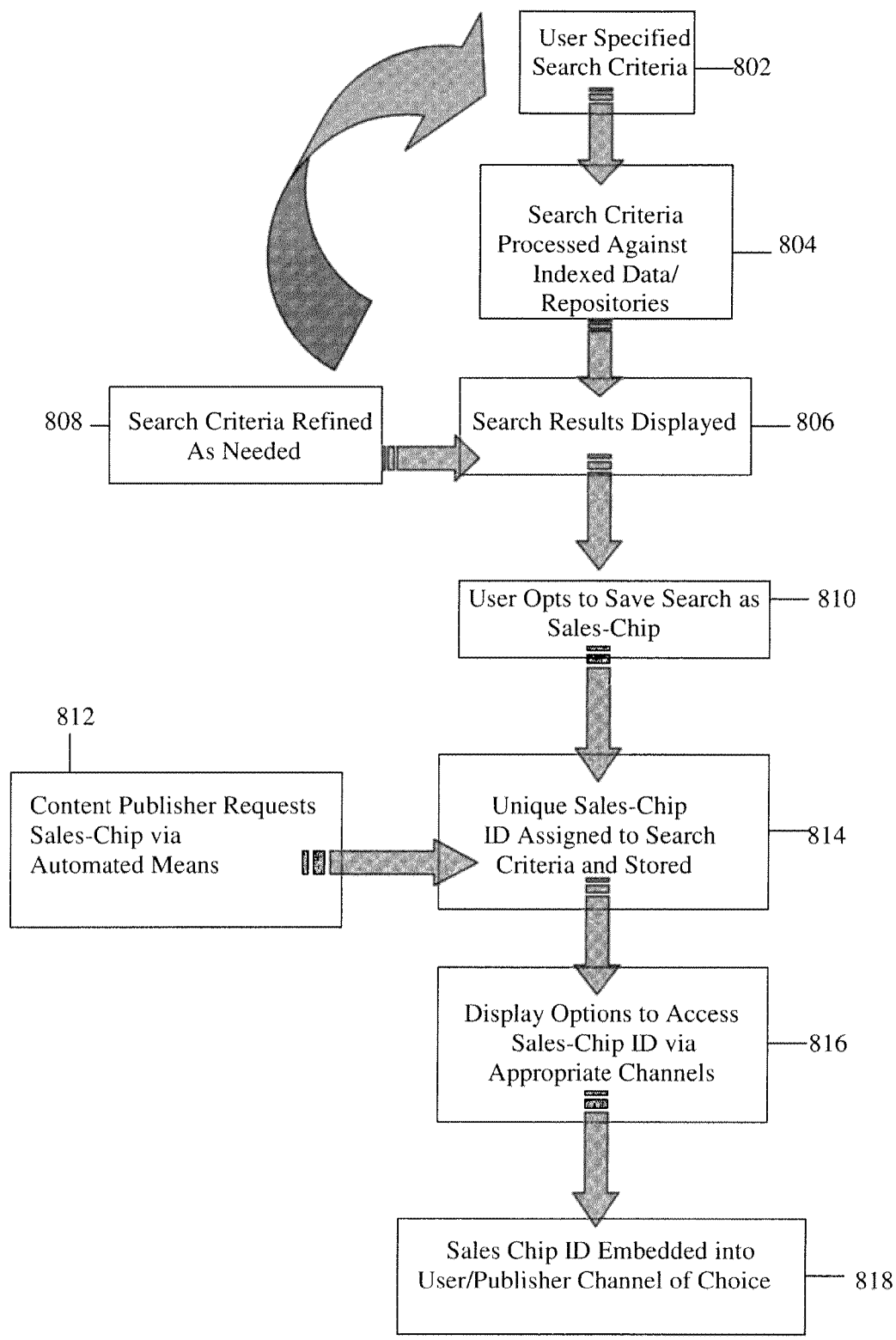

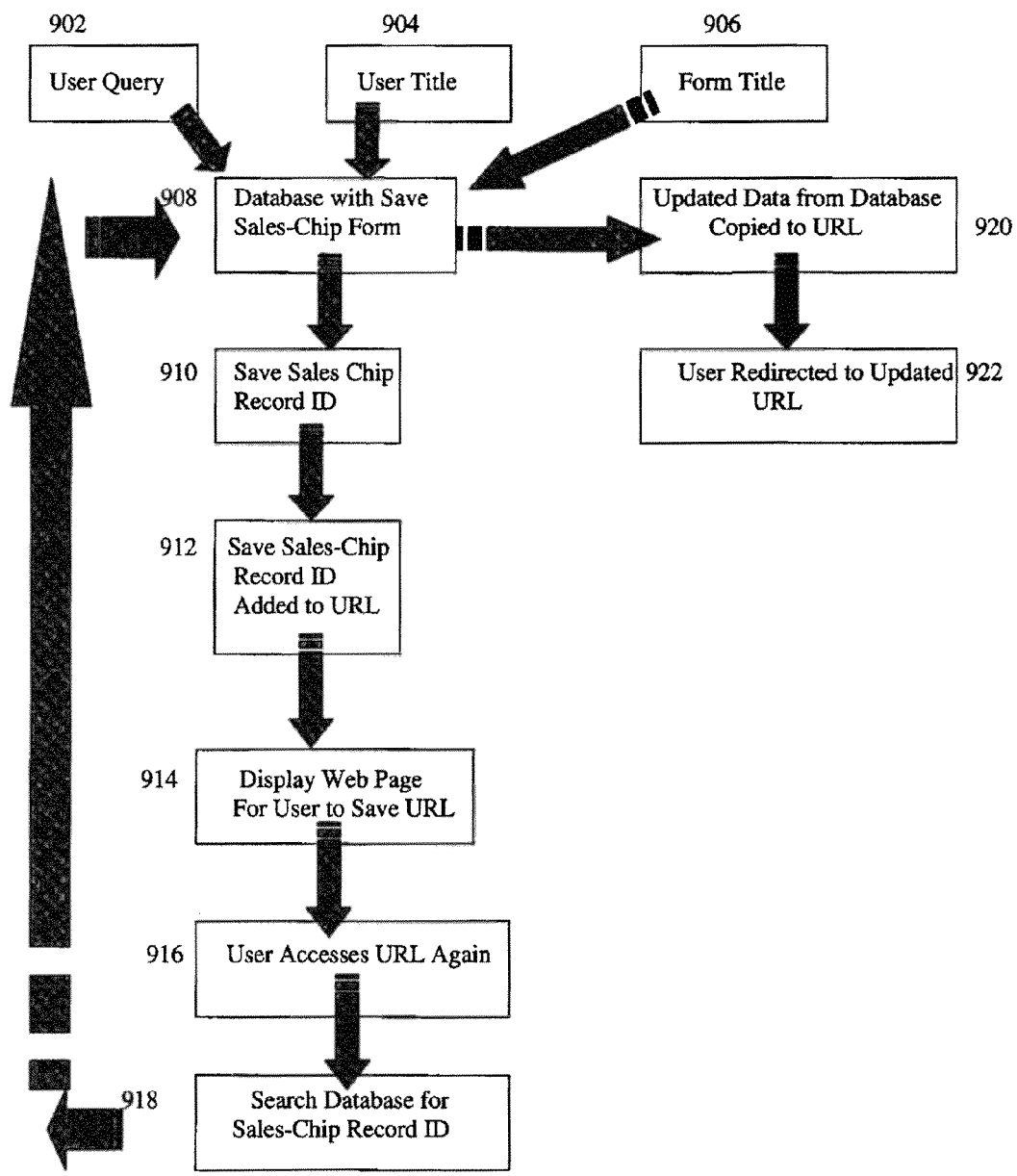

Sales-Chip Relevance Alerts: Preview Source Data URL — 1200 http://www.weather/com/current/city/fresno | Update web site URL

Right Now for
Fresno, CA
Save Location [ English | Metric ]     FREE Weather on Your Desktop 90 °F
Feels like
Fair                90 °F
Update Jul 21 04:54 p.m. PT UV Index : 3 Moderate
Wind :      From NW at 13 mph
Humitity:   24%
Pressure    29.85 in.
Dew Point:  49 F
Visibility:  10.0 mile
Sunrise:    5:58 AM
Sunset:     8:13 PM Live Traffic Reports    Watch the Fresno Forcast 1220                    1210

| Data Elements Found | Values | Select | Name Your Element |
|---|---|---|---|
| UV Index | 3 Moderate | ☐ | |
| Wind | From NW at 13 mph | ☐ | |
| Humitity | 24% | ☐ | |
| Pressure | 29.86 in. | ☑ | Barometric Pressure |
| Dew Point | 49 F | ☐ | |
| Visibility | 10.0 miles | ☐ | |
| Sunrise | 5:58 AM | ☐ | |
| Sunset | 8:13 PM | ☐ | |
| Temperature | 90 F | ☑ | Temperature |
| Date/Time | Jul 21 04:45 p.m. PT | ☐ | |

1230 — Name your Data Element for Furture Reference

Back to Wizard

*FIG. 12*

Sales-Chip Relevance Alerts: Setup Lookback

Setup the frequency in which the application will query for relevant changes. The schedule below defines the period for which the application will analyze historical changes.

— 1300

Range of recurrence
Start: [Fri 8/1/2008 ▼]   ⊙ No end date

Recurrence pattern
⊙ Daily     ⊙ Every [1] hour(s)
○ Weekly    ○ Every [ ] minute(s)
○ Monthly   ○ Every [ ] second(s)
○ Yearly

— 1310

At what hour?
Start: [8:00 AM ▼]

[ < Back ]  [ Next > ]  [ Cancel ]

*FIG. 13*

SYSTEM FOR SEARCHING NETWORK ACCESSIBLE DATA SETS

PRIORITY AND RELATED APPLICATION

This is a continuation of U.S. patent application Ser. No. 12/184,882 filed Aug. 1, 2008 entitled SYSTEM FOR SEARCHING NETWORK ACCESSIBLE DATA SETS, which is a continuation in part of U.S. patent application Ser. No. 11/620,847, filed Jan. 8, 2007 also entitled SYSTEM FOR SEARCHING NETWORK ACCESSIBLE DATA SETS, that issued on Jul. 10, 2008 as U.S. Pat. No. 7,424,471, both are hereby incorporated by reference in its entirety.

BACKGROUND OF THE INVENTION

U.S. Patent Publication No. 2005/0182828 entitled "Platform Specific Execution" discloses a media interface for use in a readable medium playback device (that) enables synchronization of disparate media playback, network directed playback of media, media playback control via displayed html/JavaScript file, logging of consumer identifier, media identifier, and playback identifier in a cookie or log file.

In this invention, cookie manager records the information for later reading including the tracking of consumer identifier, playback device identifier, and reader identifier triples. Significantly, the cookie records information in answer to a question, and "triples" the mechanism for specified action. A cookie is information that a web site (server side program) puts on a client's computer or permanent storage so that information is retained from browsing session to browsing session (or later use in the same session). Typically, a cookie records user-specific information such as past user choices during interaction with the site. Cookies are useful because the nature of the hypertext transfer protocol (HTTP) used by the World Wide Web (WWW) is that each web page request is completely independent of all other requests. Thus, a cookie is a mechanism which allows a web site to retain access to past interaction history with particular clients. The subject invention does not employ "cookies" because it: 1) does not record interaction history; 2) does not plant itself on a user's PC or other internet connected device; and 3) does not record questions or queries without the knowledge or approval of the user.

As for the "bookmark manager" in U.S. Patent Publication No. 2005/0182828, a bookmark records the necessary information to return to the same point in a video playback of a video by recording the title number, time position, chapter, angle, sub picture and language. Bookmarks maintain the state of the player by storing general parameter registers (GPRMs) for a specific title. Significantly, video bookmarks mark the last video state. The present invention, unlike conventional bookmarks, does not rely on programming that returns to a "state" or page on a web site which was last visited or marked. The present invention re-runs the query to get to a site and place most likely to produce answers which most closely match the answers originally sought by the query made previously. Therefore, an advantage of the invention is that no additional memory is required to store previous search results and that a user can immediately see any change in the results which may have occurred since the previous search.

U.S. Pat. No. 5,983,227 entitled "Dynamic Page Generator" discloses a custom page server with user preferences organized into templates stored in compact data structures and the live data used to fill the templates stored local to the page server which is handling user requests for custom pages. One process is executed on the page server for every request. The process provides a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all live data in RAM.

U.S. Pat. No. 5,983,227 is intended to help the web user create a "page" or template for seeing content of interest (most likely dynamic content) in a format most pleasing or practical for the user. Importantly, user preferences are broad, but not necessarily within the total control of the user, as in the use of defaults which include information based on the location, demographics or presumed tolerances of the user. The subject invention is not intended to deliver a specific graphic interface, and does not depend on presets or predefined preferences, which is an advantage not shown in any of the individual references nor in any combination of the references.

The objective of U.S. Pat. No. 5,983,227 is speedy delivery of content of interest which depends on two things: 1) easily customized templates by the user; and 2) storage of the desired content, even with the objective of delivering it in real time. First, the present invention is not a template, and preferences are incidental to how the content of interest is viewed. Secondly, the objective of the present invention is to store the query as efficiently as possible, which precludes the need to store results.

U.S. Pat. No. 6,957,390 entitled "Method and Apparatus for Providing Dynamic Information to a User via a Visual Display" discloses a client-server system for recording web site activity by web users and dynamically customizing web display apparatuses for optimal information presentation based on the users' prior activity history. The system assigns each user a user identifier that allows the system to track the user's web sessions. The system also assigns every web site an application identifier that allows the system to track the user's activities at a particular web site. The system then records the user's activities as they visit different web sites via the user and application identifiers. The system determines how the user prefers to view each web site based on prior activity, their preferences, the web site, and various other factors. As the user surfs from web site to web site, the system dynamically configures the user's web browser and the web page information for optimum presentation based on how the user prefers to view the web site.

U.S. Pat. No. 6,957,390 is intended to deliver optimized views of web page(s), in configurations ("visual displays") that the user's history suggests he prefers. The presentation is based on the user's prior activity and preferences. The present invention is a search engine that refreshes its queries based on demand, either at will by pressing a button (link) or via possible presets—not based on the user's history of activities.

Although the intent of U.S. Pat. No. 6,957,390 is to return to sites or information that the user may want to visit more than once, the methodology for accomplishing this is vastly different than that of the present invention. The system of U.S. Pat. No. 6,957,390 starts with "The user install(ing) a web display application for each web site they want the server system to track and customize." The present invention starts when the user determines that search results are satisfactory, and then presses a Regenerating Search Engine (RSE) button to record the query for conversion into its own search engine. Therefore, a unique feature of the present invention is that the user is in complete control at all times.

U.S. Patent Publication No. 2004/0220893 entitled "User Interface for Managing Semantic Objects" discloses a comprehensive system for augmenting computer-mediated collaboration and communication of knowledge and information, using the concept of "semcards," that can be interconnected via a particular type of semcard that functions as a semantic link, to form distributed knowledge networks.

A semcard is a semantic software object that contains slots with semantic tags, and content, all of which can be represented semantically, optionally using ontology, and rules embodying optional rules regarding automation, goals, display, access permissions and other policies, sharing, and other operations of the semcard and its referent. The target is what the semcard is all about: it is an entity or concept that the semcard represents or describes and holds metadata about. It can be a physical entity such as a living person, a software entity such as a data record or word processing document, or an intangible entity such as an idea or feeling. Further, any type of digital object or information can be attached to a semcard, e.g. a digital certificate, a link to a web or a product or service offer, an SKU, a data record in a database, or knowledge item, software, or a file or media object, media streams, a link to remote Web service, etc. Semcards can also be used themselves to represent the relationship between other semcards, for example, that the person is the author of the idea. Physically, a semcard can be thought of as a form with fields or slots, and has two incarnations, template and instance, which correspond roughly to the object-oriented program concepts of object template and object instance.

Significantly, all examples of semcard application involve the creation of tables or fields for matching information in one set to one or more others for the purpose of sharing or exchanging content of interest. They are also used to create tables of product hierarchies and note preferences that can be used digitally to perform tasks.

Although semcards are capable of cataloguing queries for future use, it would appear from the patent holder's description, doing it with a semcard is very different than in the present invention. First, whether it was done in advance, during, or after the query, a semcard must be "drafted." Then, information must be entered into a "slot" or "field" and compared or matched with other data for an event (such as search or sharing with others who work on the same project) to occur.

In contrast, the subject invention saves the query of a "successful" search in a configuration that converts it to a script that allows it to function as a search engine that refreshes itself—with just one click of the mouse. Only the reconfigured query is stored in a web-friendly database structure on a server. Thus, it may be copied as a script to a web-friendly field, or saved via a target link for storage on a hard drive in any file that interfaces with the internet (or, potentially, any relational files). First, with the present invention the user simply presses a button to save a search, and then chooses whether he wants to copy and paste it to a web-friendly field, or save it as a target link where it can be stored in a file for later use as an attachment to an e-mail or other web-based communication system. Finally, when it comes to reuse, the user merely has to click a URL to re-run the saved search. Clearly, the user did not have to create a semcard to save or activate a search.

U.S. Patent Publication No. 2003/0055914 entitled "Communication Apparatus and Method, Recording Medium, Program and Content Providing Apparatus" discloses a content providing system having a terminal and a server. The terminal includes a selector for selecting search information from information presented to a user; a search information transmitter for transmitting the search information selected by the selecting means to the server; and a content data receiver for receiving content data corresponding to the search information supplied from a Handler. The server includes a storage device for storing the content data corresponding to the search information; a searcher for searching the storage means for the content data corresponding to the search information supplied from the search information transmitter; and a content data transmitter for transmitting the content data received from the storage information to the terminal.

U.S. Patent Publication No. 2003/0055914 addresses a different objective than the present invention, which is aggregating unlinked web sites, so that they are available via one search. According to U.S. Patent Publication No. 2003/0055914, when a user reaches a web site and wants to obtain access to another site referred to on the first site that is not linked, the user must again access the search engine. The keyword for the other desired content must be re-entered to go to the site holding that content. The search engine site must be accessed every time the user desires content, which takes time and labor. The objective of the subject invention is to save searches for information—whether the results contain links or not—to re-run queries quickly and conveniently in a broad array of web-friendly environments. It is not necessary to reenter a search team to renew a search. Rather, the subject invention records and edits a query to rerun a search on demand and the query can be stored in two different modes neither of which requires any hardware beyond a PC connected to the Internet.

U.S. Patent Publication No. 2002/0143895 entitled "Method for Generating a Presentation for Re-locating an Information Page That Has Already Been Called" discloses a method to generate a "presentation" for re-locating an information page that was already called from a home page of an information vendor. The home page can be called via the Internet, an intranet or an extranet. A displayable presentation is generated from which the called information pages of the information vendor can be recognized.

U.S. Patent Publication No. 2002/0143895 addresses a different objective than the present invention which is: retracing the steps to return to a web site after the user has left the site, and presumably gone to other sites or locations where it is impossible to back arrow to the original site. The present invention, on the other hand, is saved at the time the successful search was made, obviating the need to communicate what steps need to be re-traced.

U.S. Pat. No. 6,834,276 entitled "Database System and Method for Data Acquisition and Perusal" discloses a database selection module, which enables selection of a plurality of files, objects, or documents for inclusion into at least one selectable database. Also disclosed is a link module, which enables custom links to be defined between selected terms of selected files of the selectable database; a database index generator module, which enables generation of a searchable index of the data contained in the selectable database; and a search module that enables a search to be performed of the searchable index according to a search criterion.

U.S. Pat. No. 6,834,276 addresses different objectives than the subject invention, namely the generation of searchable indexes for the purpose of linking files for a wide variety of information-driven tasks, as well as to store results from various sources including the internet with internet formats files, objects or documents.

The purpose of the present invention is to empower the user to create custom searches of theoretically any network accessible data set and to save and associate those searches with a unique identifier for easy reference. The results presented via the inventive search method is intended to be the most recent and relevant for the custom search criteria that the user has selected, versus linking or sorting files for other applications, as in U.S. Pat. No. 6,834,276.

U.S. Pat. No. 6,344,855 entitled "Encapsulated Network Entity Reference of a Network Component System for Integrating Object Oriented Software Components" discloses a network-oriented component system that efficiently accesses information from a network resource located on a computer network by creating an encapsulated network identity that contains references to that resource. The encapsulated entity is preferably implemented as a network component stored on a computer remotely displaced from the referenced resource. In addition, the encapsulated entity may be manifested as a visual object on a graphical user interface of a computer screen. Such visual manifestation allows a user to easily manipulate the entity in order to display the contents of the resource on the screen, or to electronically forward the entity over the network.

U.S. Pat. No. 6,344,855 requires an "encapsulation" that includes a "pointer," such as a URL, that identifies the network address of that resource, e.g. a Web page. In addition to storing the pointer, the encapsulated entity also contains information for involving appropriate network components needed to access the resource.

In the present invention, however, nothing is hidden or "encapsulated." The script that runs the query, and re-runs it when the link is clicked, is in plain sight. When a search is saved as a target link, the HTML file has a name in script Like any file on any operating system it can be re-named by the user for more convenient reference. No object has to be created to hide all or part of the process that produces a search or its functions. The results of a saved search are referenced via a unique identifier. They can be accessed from or integrated with multiple network-connected user interface channels (desktop shortcut, e-mail, contact manager field, web portal, mobile device, etc.) to provide additional context or conveyance in reviewing the results. As stated above, the script that make this possible is always in full view, and usable as expressed in HTML. However, it is important to note that the invention is not limited to the use of HTML, but can be implemented using other programming languages as described in greater detail below.

U.S. Pat. No. 6,185,614 entitled "Method and System for Collecting User Profile Information over the WWW in the Presence of Dynamic Content Using Comparators" discloses a method and system for collecting profile information about users accessing dynamically generated content from one or more servers.

A server dynamically generates a web page in response to a user request. The server customizes the web page content based on the requested universal resource identifier (URI) and one or more of:
 The user's identity;
 Access permissions;
 Demographic information;
 Previous behavior at the site.

The web server then passes the URI, user identity, and dynamically generated web page to an access information collector. The access information collector then generates document comparators from the current web page content and compares them to document comparators associated with previously retrieved web pages. If the current web page is sufficiently similar to some previously retrieved web page, the access information collector logs the URI, user identity, and a document key associated with the matching previously retrieved page. Otherwise, the access information collector generates a new key; stores the new key and the document comparators in a database; and logs the URI, user identity, and the newly generated document key.

The only similarity that U.S. Pat. No. 6,185,614 and the subject invention share is the use of an identifier to retrieve content of interest. However, the subject invention does not use comparators to establish identifiers. On determining that the results of a request are satisfactory, the user clicks "Save" to initiate the process of assigning a unique identifier to the query—not the content. Further, the identifier is simply a number assigned by widely available technology. No elaborate comparator is necessary.

U.S. Pat. No. 5,649,186 entitled "System and Method for Computer-Based Dynamic Information Clipping Service" discloses a system and computer-based method providing a dynamic clipping service comprising the following steps:
 An end user creates a template of topics of interest via a graphical interface;
 The template is transmitted to a central site;
 Information relating to a particular base of knowledge is collected; Parsed and indexed;
 The parsed and indexed information is stored in an information repository;
 The template is processed by parsing and collecting command-strings relating to topics of interest found within the parsed template;
 The information repository is searched using the collected command-strings to generate query results;
 The results are sorted;
 An HTML page is created using the sorted query results;
 The page is then made available to the end user for viewing, wherein the page represents a custom network-based newspaper.

U.S. Pat. No. 5,649,186 is designed to enable computer networks to "read" contents of interest, and dynamically convert pages of requested content into a format that is similar to a newspaper. In essence, this invention is an automatic clipping service.

In contrast, the subject invention does not use an "infobot" to find content of interest, and a template to be processed so that the "command string" may be generated and reside in a "master topic file" for information retrieval at a later date. Further, parsing is unnecessary because each saved search is stored as a unique identifier that does not require further processing as mentioned above. If the search was saved, it was deemed appropriate by the user who saved it.

U.S. Patent Publication No. 2003/0080993 entitled "Dynamically Autoconfigured Feature Browser for a Communication Terminal" discloses a feature browser display in a communication system terminal controlled in accordance with user-specific feature utilization history information. The utilization history information may include, e.g. a set of utilization counters for each of a number of features supported by the system, and the presentation order may be determined by sorting the utilization values of the corresponding features in an increasing or decreasing order. The utilization counters may be stored in a feature presentation management table that is implemented in the terminal and includes:
 A feature identifier;
 A presentation order number;
 A utilization counter for each of the features.

In a state-based embodiment, a different feature presentation management table is maintained for each set of designated terminal states, such as on hook, off hook, and active (e.g. the phone, "reset," "re-dial," "on-hold," "conference call," "auto-dial," etc.). The feature browser utilizes the feature presentation management table(s) to determine the user-specific order in which features are to be presented on the terminal display;

U.S. Patent Publication No. 2003/0080993 is based on the premise that cell phones have limited display space and require a lot of scrolling and toggling to get to the features a user wants to use most. The feature browser display simultaneously displays identifiers of multiple features, and a particular one of the features determines presentation order. "Identifiers" use short descriptions or symbols of the features to make the most of limited display space.

In contrast, the present invention retrieves search commands so that they do not need to be rebuilt to rerun a new query. Identifiers, in this case, stem from the results of a saved search that are referenced via a unique identifier which can be accessed from or integrated with multiple network-connected user interface channels (desktop shortcut, e-mail, contact manager field, web portal, mobile device, etc.) that can provide additional context or convenience in reviewing the search results. The identifier of the subject invention is an Internet URL that is uniquely associated with the search criteria via an ID number.

SUMMARY OF THE INVENTION

The subject invention provides for the creation of personalized search requests across a broad array of search sources and user interface platforms, permitting a novel search technique that is extremely easy to use, fast and efficient and unique in the benefits it provides to a user.

The subject invention includes the creation of an Identifier that serves as a single, convenient and portable reference to custom search criteria which the user has specified and saved. The Identifier is implemented as a number which is passed as a reference in a URL and also includes reference to a Handler application whereby accessing the URL will display the search results. The URL can be accessed from and integrated with multiple user channels connected to the Internet to permit execution of the URL and display of the search results.

The format of the Identifier is flexible and can take the form of alphanumeric or binary representations as long as that representation is unique and can be processed via a Handler application that is accessible to the user. This concept applies to any platform where a unique Identifier can be associated with a network-attached data set.

While the Identifier establishes a relationship with a search and associated data set, it can also control other aspects of the user experience which can be dictated by the user at the time of search creation. Presentation options can be specified by the user, such as a template to use in displaying the information. These presentation options can refer to almost any facet of the presentation. Options might include the results themselves (in terms of sort order or varying levels of detailed views) or the aesthetics of how the information is displayed in terms of color scheme or graphical layout.

The Identifier could also be used to uniquely identify a user in conjunction with a data set. User identification is accomplished via the presence of a cookie on the user's browser which authorizes the display of the results.

The results of saved searches may currently be accessed via a variety of means such as:

A repository of all of the user's saved searches may be accessed via a custom profile page on a web site;

The URL of an individual search can be cut and pasted onto any vehicle that supports a URL, such as a desktop shortcut or contact manager;

An individual search can be saved as an HTML file to the user's desktop; opening this HTML file on the user desktop will, via JavaScript, re-direct the user to the URL so the user can view the search result.

The reference implementation has been built using the Perl and JavaScript programming languages, however, the concept is not limited to a specific development language. The only development and operational limitations are the limitations represented by the specific web and/or user interface platform available to the user. For example, it might not be possible to permit the saving of an HTML file to a mobile phone, but the concept could be adapted to using an interface technique that matches that operating environment. In such a context, the present invention might be represented as an SMS ID that was stored in the user's address book.

A Sales-Chip Relevance Alert extends the capability of the regenerating search engine by allowing users to become informed about relevant information that has changed to a second query or search request that is run after a first query or search request. The user can narrowly and specifically describe with a high degree of precision what is relevant and meaningful to the user and how the user is notified. The Alert provides a timely notice to the user about the relevant information change through user defined means and user defined messages.

BRIEF DESCRIPTION OF THE DRAWING

FIG. 1 is a first screen shot of the graphical user interface of the subject invention;

FIG. 4b is a fifth screen shot of the graphical user interface of the subject invention;

FIG. 5b is a eleventh screen shot of the graphical user interface of the subject invention;

FIG. 5c is a twelfth screen shot of the graphical user interface of the subject invention;

FIG. 7 is a fifteenth screen shot of the graphical user interface of the subject invention;

FIG. 8 is a flow chart of the logic process of the subject invention;

FIG. 9 is a flow chart of the software logic of the subject invention;

FIG. 12 is a third screen shot showing a graphical user interface of an Alert embodiment of the subject invention;

FIG. 13 is a fourth screen shot showing a graphical user interface of an Alert embodiment of the subject invention;

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

The inventive system for searching network accessible data is referred to herein by the trade name "SalesChip" and is integrated in one non-limiting embodiment via the on-line publication "$ALE$-FAX NEWS." The present invention is a command-string which saves a query in a database, and subsequently allows the query to be reactivated with the help of a Handler. The Handler conducts a search for a unique Identifier, and forwards the results (the saved query) to a URL with instructions that tell a server to re-run the query.

Figure 1:
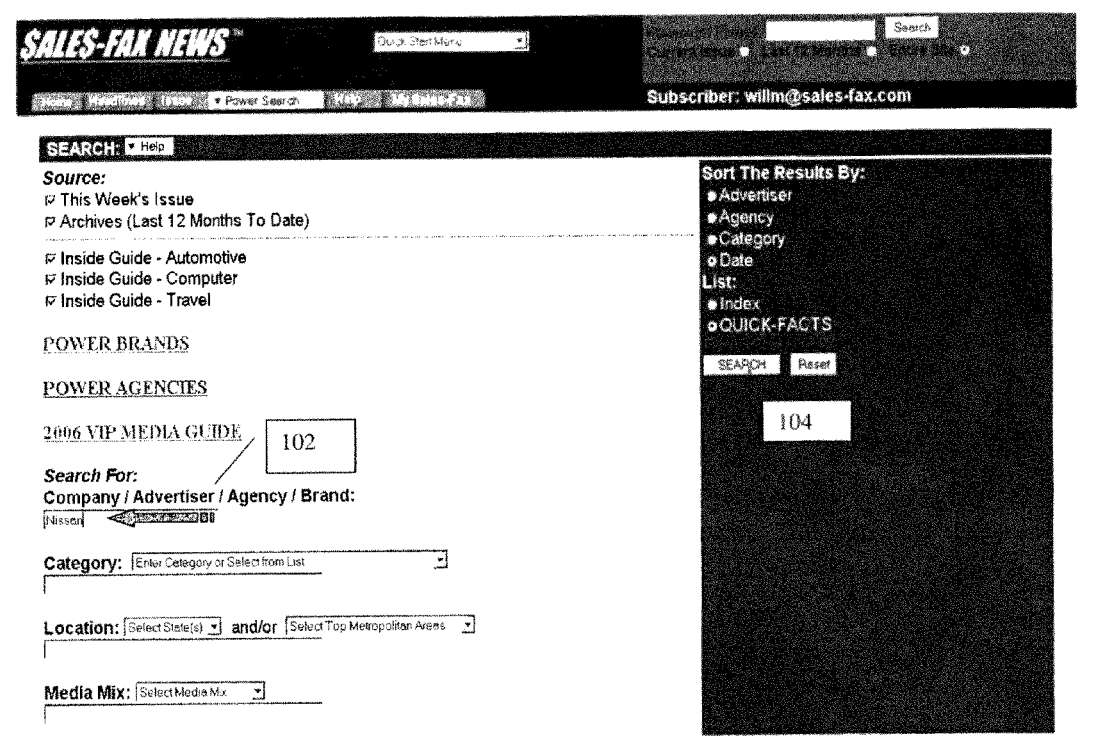
Figure 2:
FIG. 2 is a second screen shot of the graphical user interface of the subject invention.
Figure 3:
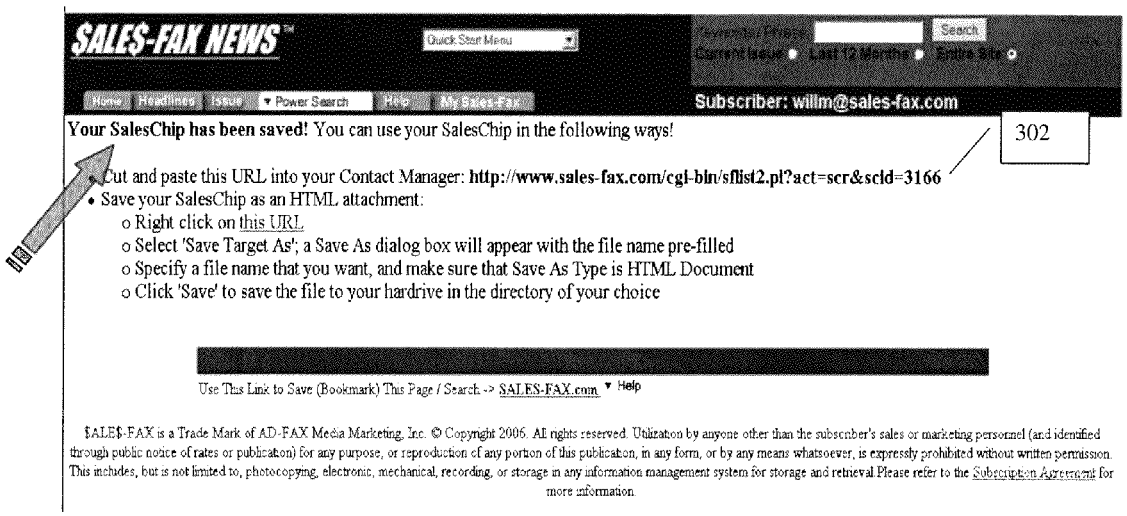
FIG. 3 is a third screen shot of the graphical user interface of the subject invention.

Referring now to FIG. 1, the process begins with entering a query into a search engine. The example shown in FIG. 1 is a query for "Nissan" entered in the "Parent/Company" search box 102 and using Search Button 104 to search. If the results of the search are satisfactory, the search is saved. FIG. 2 shows the results of searching for any news about Nissan published by $ALE$-FAX NEWS. The UI (User Interface) in this embodiment is a button labeled "Save SalesChip" which is shown in FIG. 2 as the Save SalesChip button 202. The term "SalesChip" is the term used for the inventive embodiment shown in the drawings. However, it is to be understood that the generic term for this function is a Regenerating Search Engine (RSE), which is used interchangeably with "SalesChip" herein. Activating the "Save SalesChip" button allows the user to send a command string, which produced the desired search result, to a database where it is given a unique Identifier 302 (FIG. 3). In this embodiment, the unique identifier is numeric, but it could be any binary system of characters.

Figure 4A:
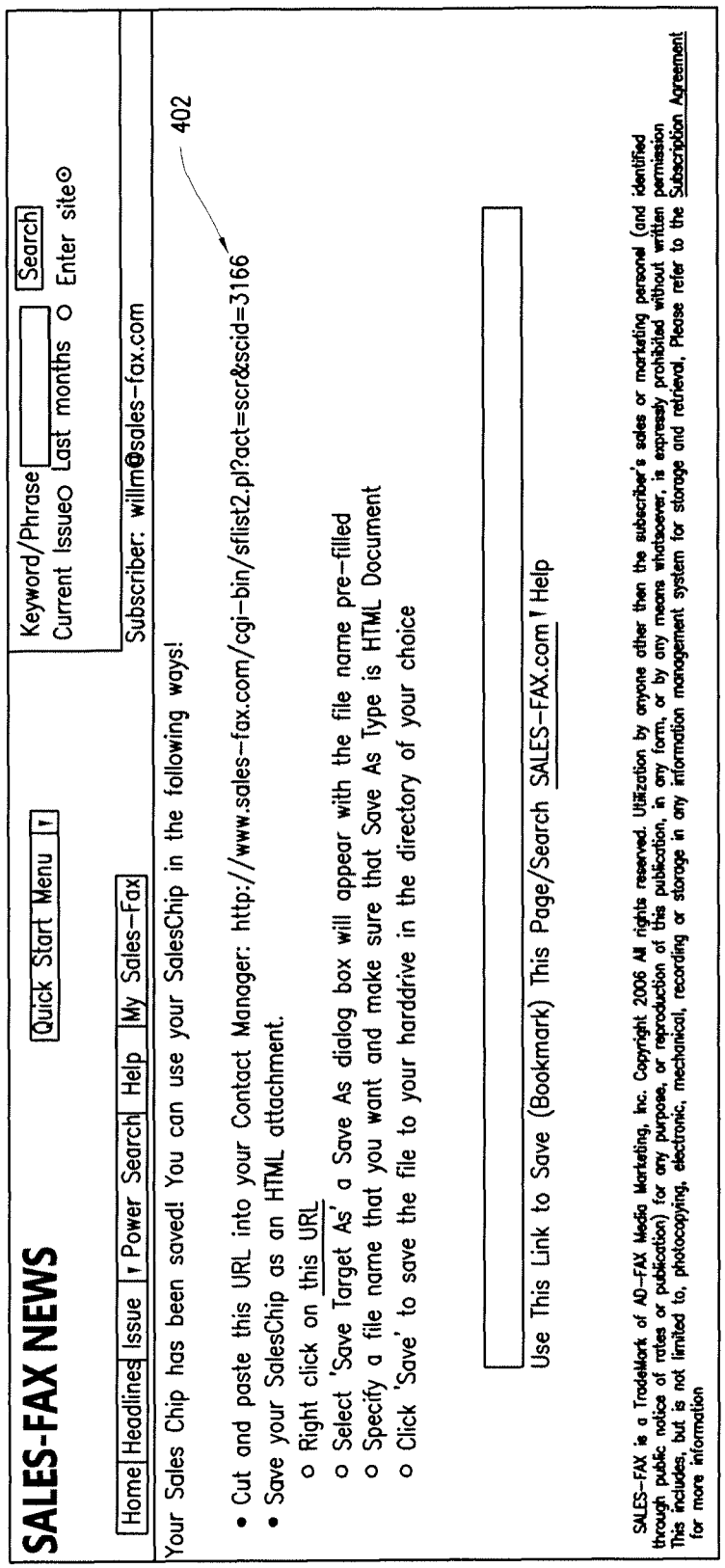
FIG. 4a is a fourth screen shot of the graphical user interface of the subject invention.

To make the query accessible in any web-friendly environment, a Handler application presents the user with two formats. First, as a command string with the unique Identifier specified at the end (in this example, the query for "Nissan" ends in 3166), which may be copied to a web-friendly field. As shown in FIG. 4a the command string 402 has Nissan's unique identifier "3166" at the end. Second, if saved as a "target link," it may be saved in an HTML format to file via the following steps at 404 of FIG. 4b.

Figure 4C:
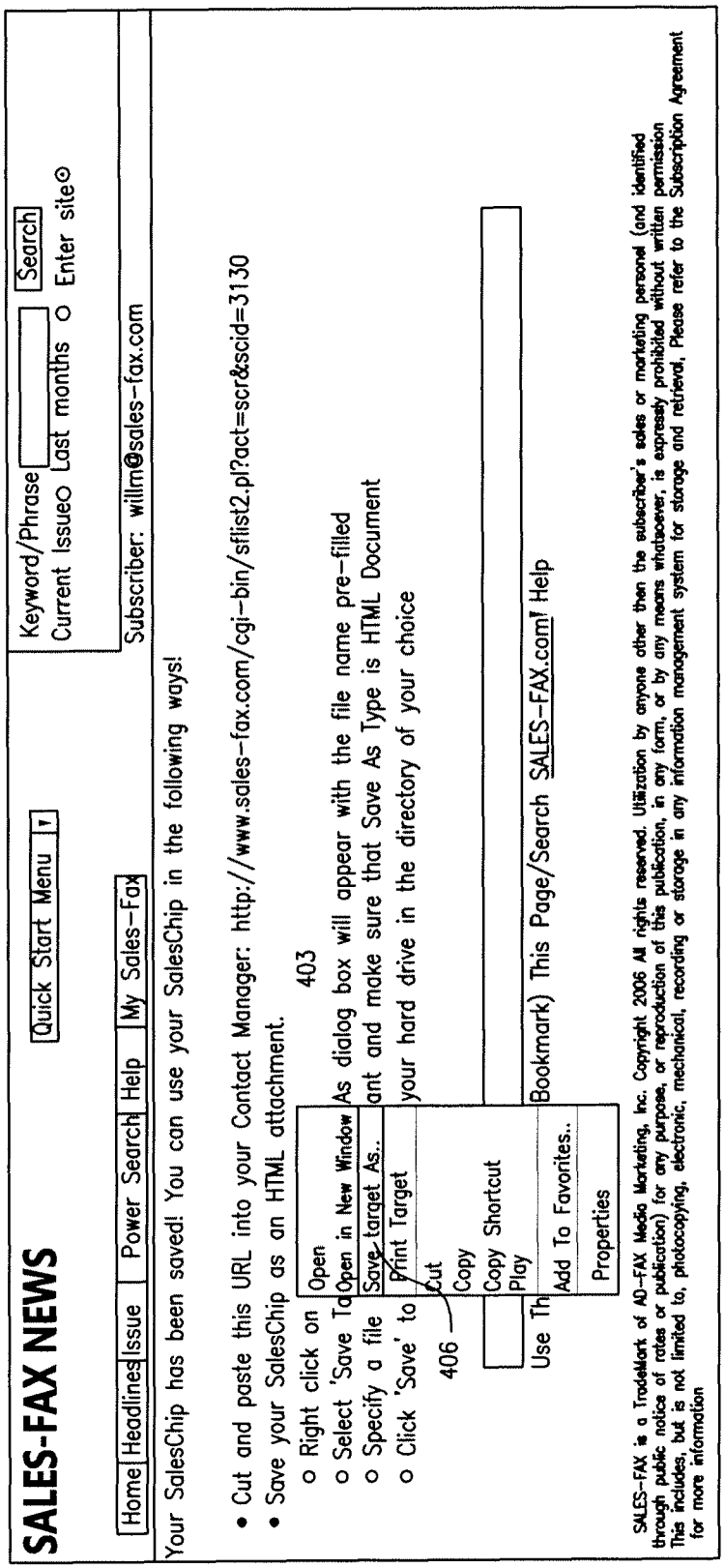
FIG. 4c is a sixth screen shot of the graphical user interface of the subject invention.
Figure 4D:
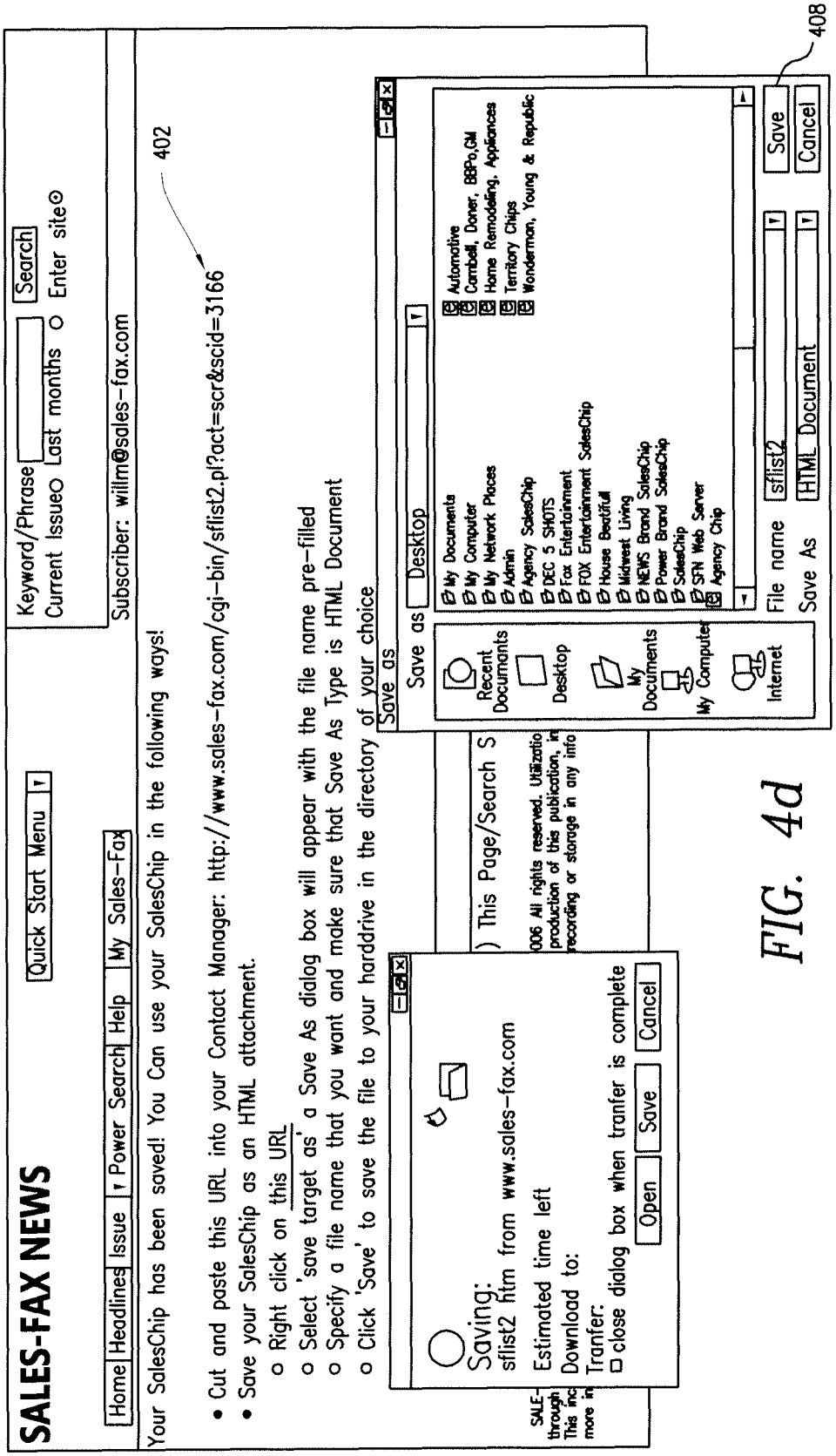
FIG. 4d is a seventh screen shot of the graphical user interface of the subject invention.
Figure 4E:
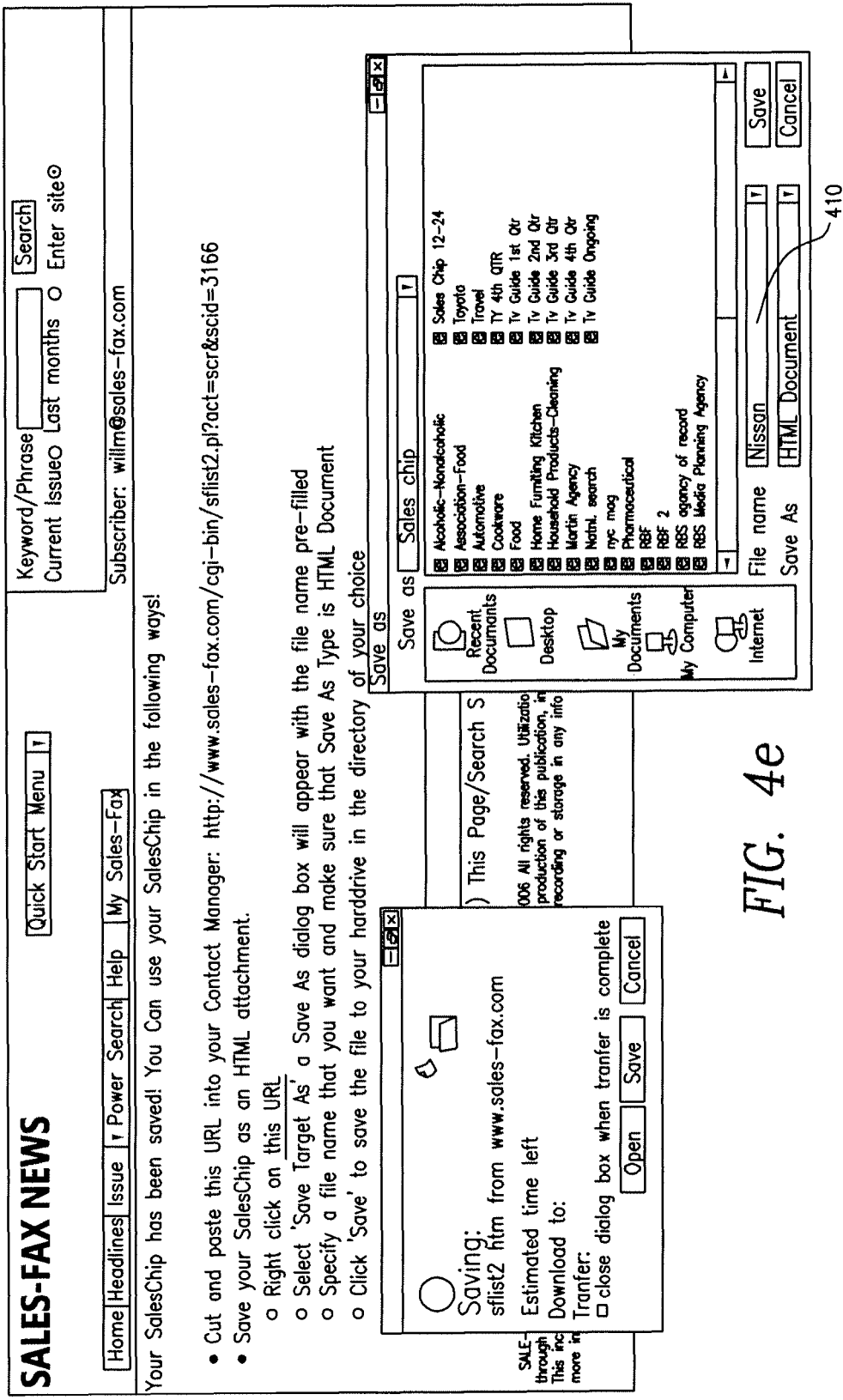
FIG. 4e is an eighth screen shot of the graphical user interface of the subject invention.
Figure 4F:
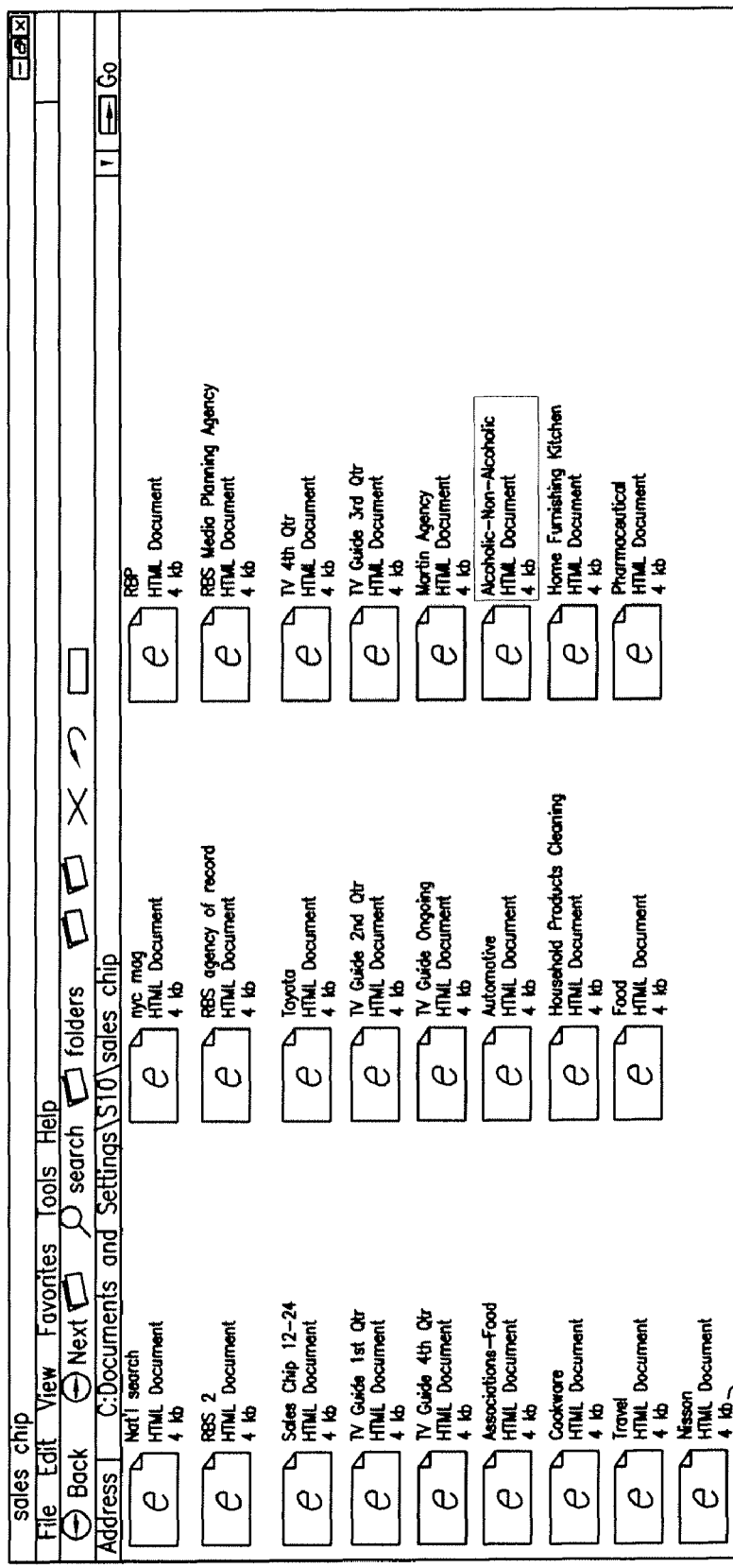
FIG. 4f is a ninth screen shot of the graphical user interface of the subject invention.

First, right click target file (FIG. 4b shows the target link 403 in underlined, blue type). When the user chooses "Target Link," the Handler searches for the unique identifier and directs the script "sflist2.htm" to a folder designated by the user. FIG. 4c and FIG. 4d shows the process by which the saved query with the unique identifier moves the link to a folder for storage as an HTML file at 406 and 408. The user gives the file a convenient name, in this case, "Nissan" and FIG. 4e shows the file with the name "Nissan" at 410. The user then saves the renamed file with an HTML extension and FIG. 4d shows how the Save button 408 is utilized to add the new query to the folder as an HTML file. The SalesChip/RSE now resides in the designated folder for future use in the folder, or other applications as an attachment. FIG. 4f shows the renamed SalesChip/RSE file in the folder at 412.

Figure 5A:
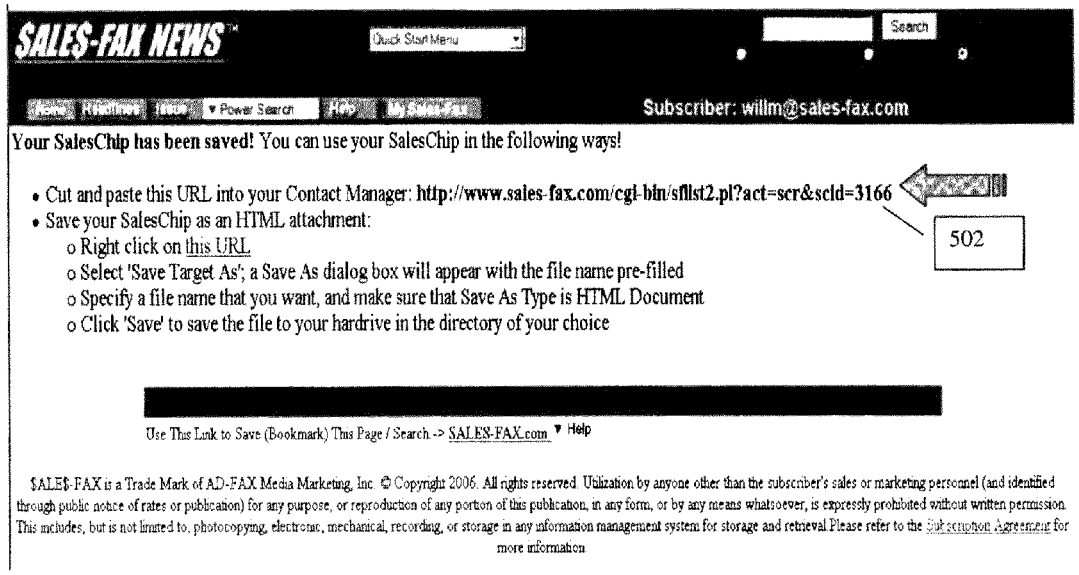
FIG. 5a is a tenth screen shot of the graphical user interface of the subject invention.
Figure 5B:
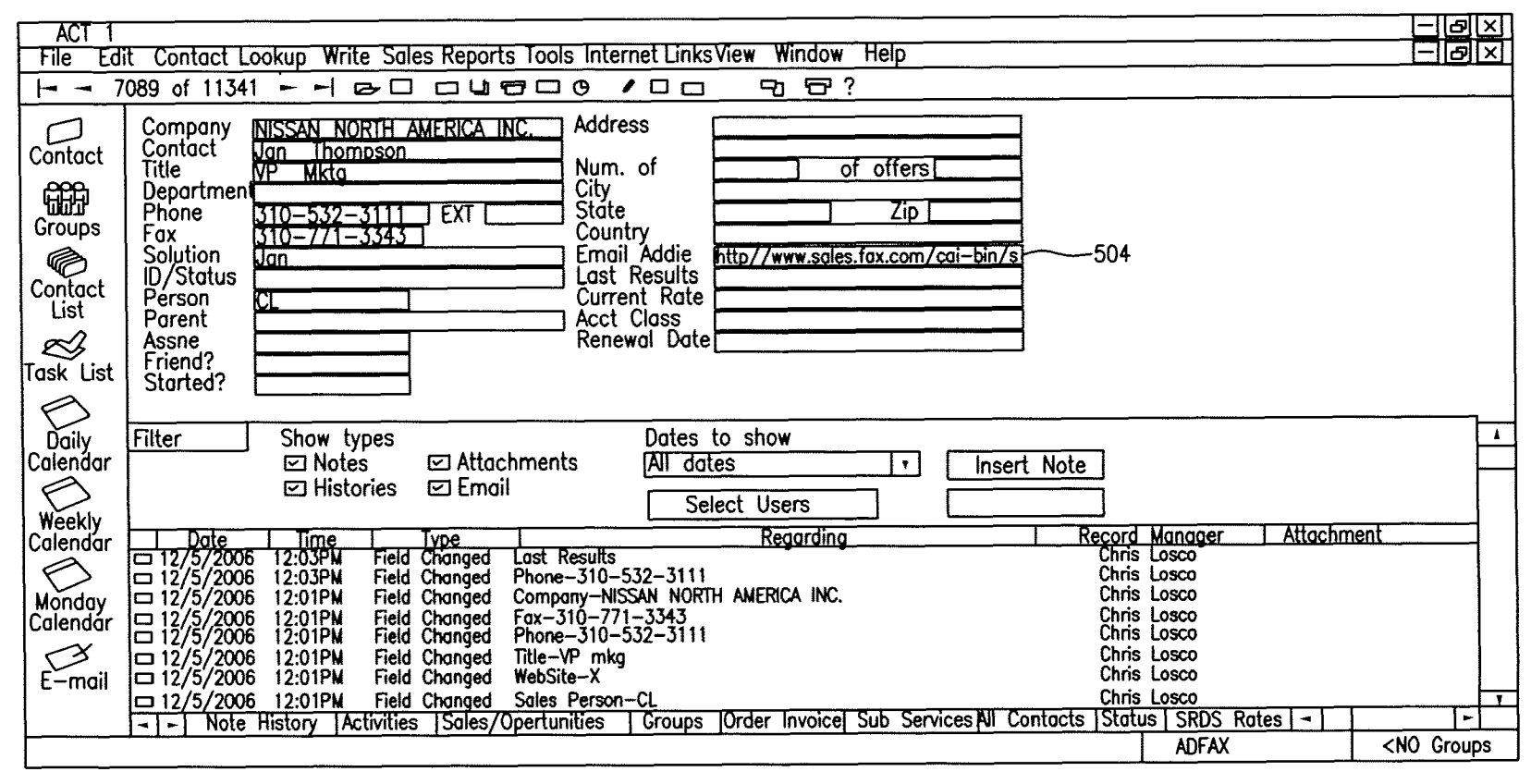
Figure 5C:
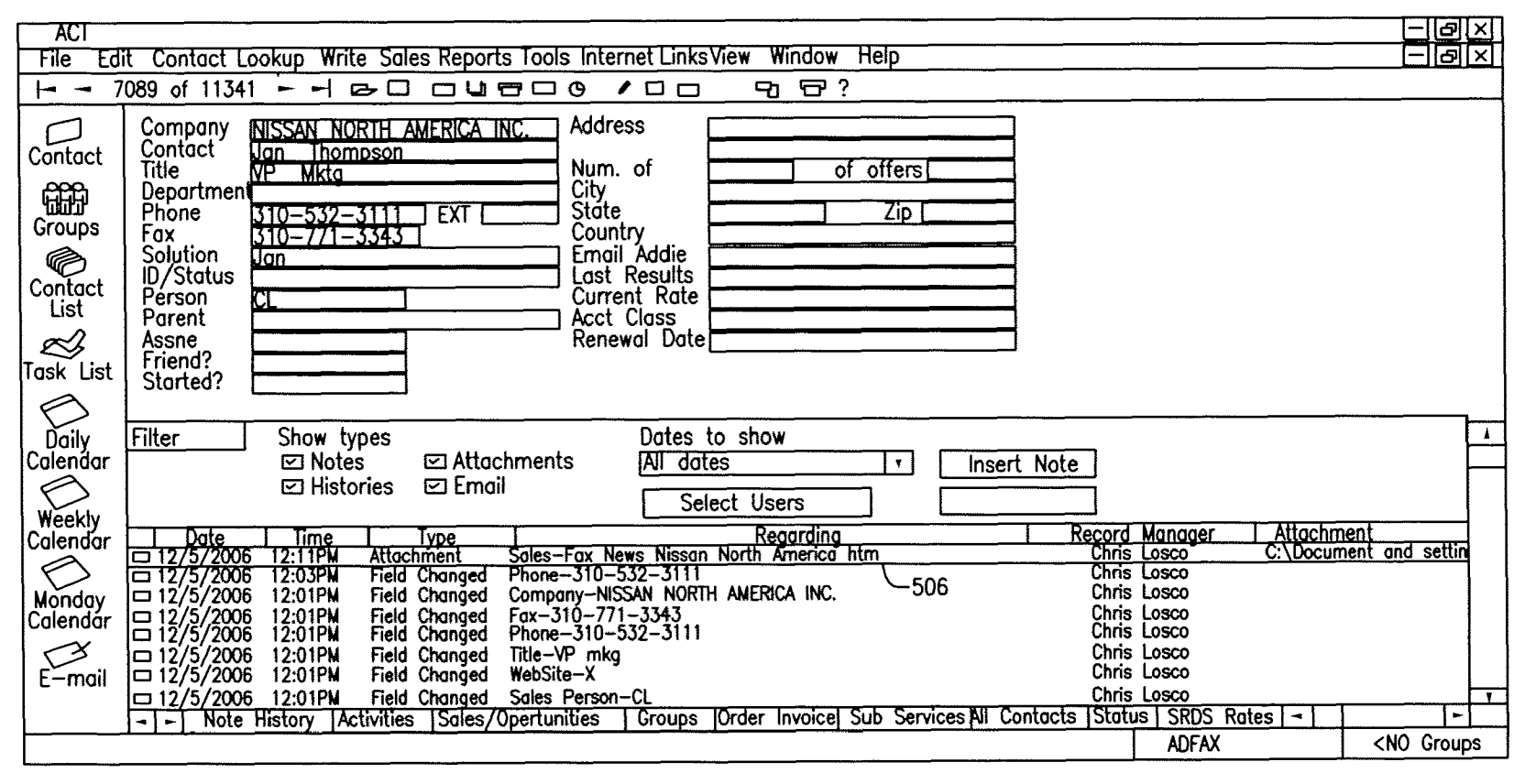
Figure 5D:
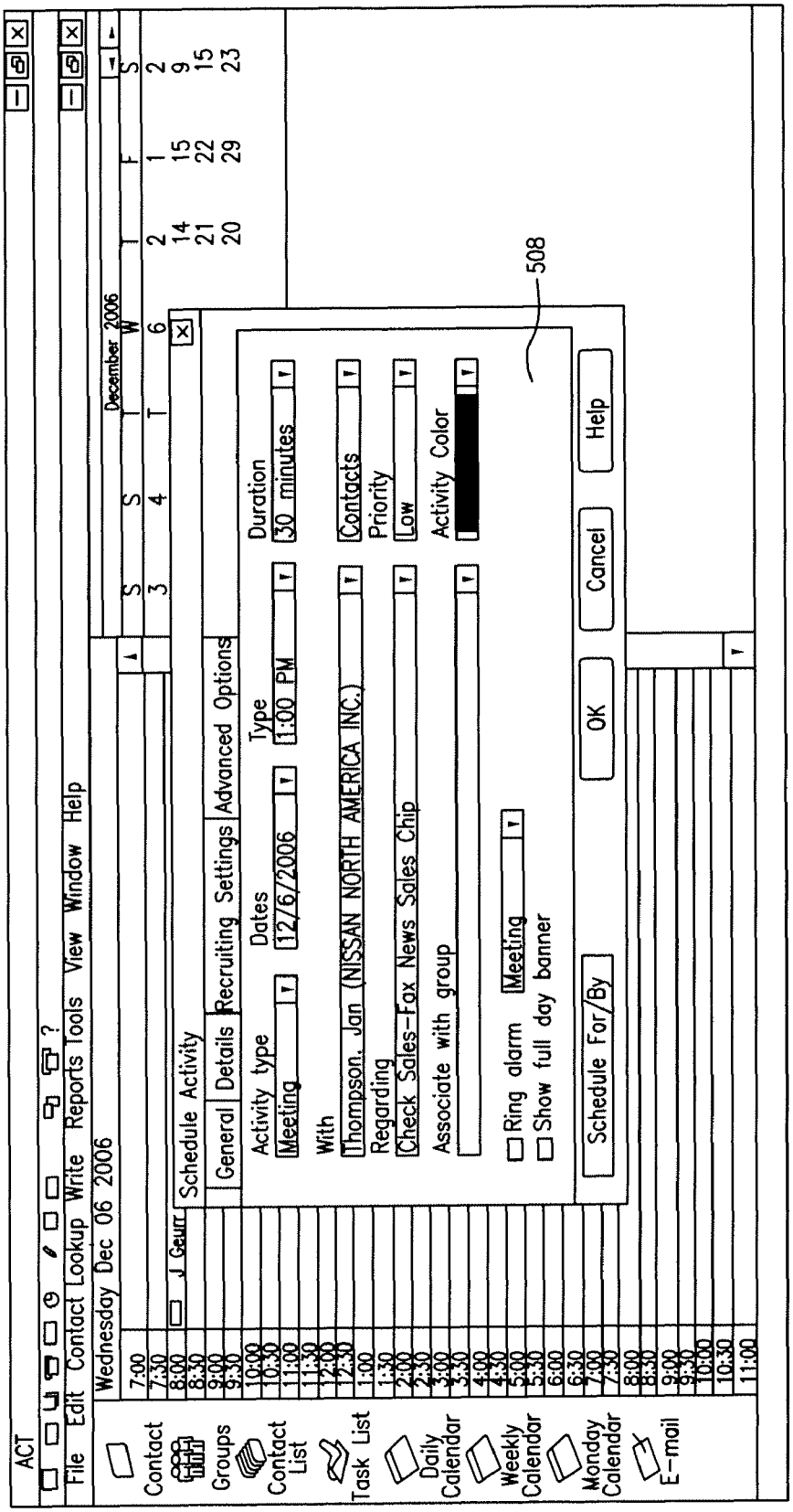
FIG. 5d is a thirteenth screen shot of the graphical user interface of the subject invention.

In the current embodiment, software of the subject invention is transportable, via copy and pasting the java script 502 (FIG. 5a) to a web-friendly field 504. FIG. 5b shows the SalesChip/RSE script residing in a web-friendly field in ACT! in a contact manager. Or, the SalesChip/RSE script may be attached as an HTML file to a "Notes History" section of a contact manager or a digital calendar. FIG. 5c shows a SalesChip/RSE HTML file attached to a "Notes History" entry 506 and FIG. 5d shows the process by which a SalesChip/RSE command string is pasted into ACT!'s digital calendar 508.

Figure 6:
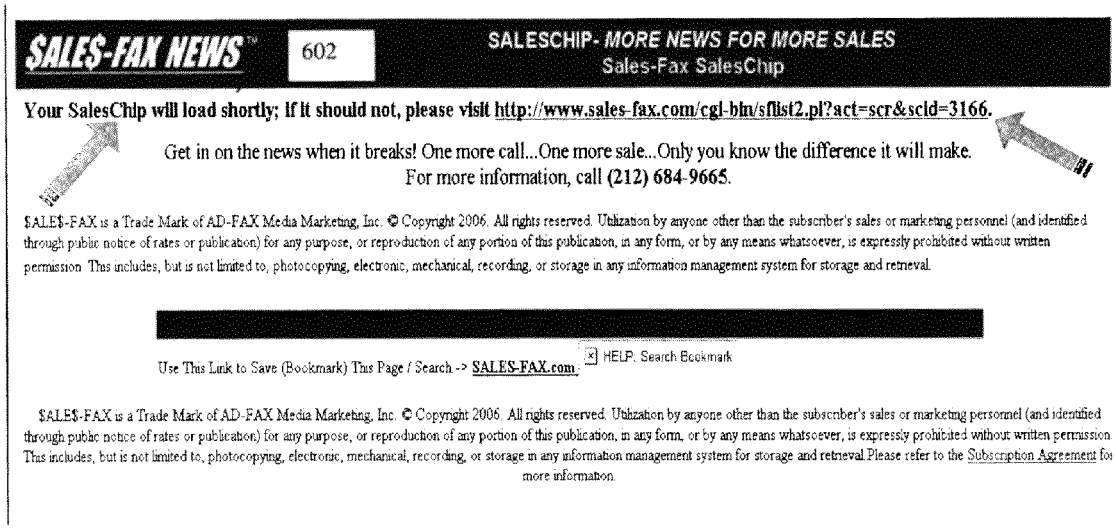
FIG. 6 is a fourteenth screen shot of the graphical user interface of the subject invention.

When either of the above FIG. 4 formats is "clicked," the Handler searches for the unique command string number and sends the command string to a browser to reach a specified URL, where the command string includes instructions for the server that the query may be run as though it had just been entered. When the query is re-run, the latest, or newest, results are registered at the top of the results page. FIG. 6 at 602 shows the result of clicking a SalesChip/RSE command string or HTML file and FIG. 7 shows in this diagram that the dates of entry on the right hand column have sorted the query results in reverse chronological order at 702.

Next referring to FIG. 8, the logic process 800 of the subject invention is shown. At 802 the user enters the desired search criteria. At 804 the search criteria of 802 is processed against indexed data. At 806 the results of the processing of step 804 are displayed. At 808, the process 800 loops back to 802 whereby refinement of the search criteria can be implemented. At 810 the search is saved using the search command-string code of the subject invention. At 814 a unique Identification is assigned to the saved search and is stored. At 812 content publishers can request by automated protocol the unique Identification and search criteria of 814. At 816 various display options are provided to the user to access the unique Identification and the search results. At 818, the unique Identification and related search are enabled based on the selection of the display options presented at 816.

Next referring to FIG. 9, the software logic flowchart 900 of the search command-string code ("SalesChip,/RSE" herein) is shown. User query 902, user title 904, and Form title 906 populate and save the SalesChip/RSE form within database 908. From the saved SalesChip/RSE data in database 908 a unique record Identifier is created and saved at 910. At 912 the saved unique record Identifier of 910 is added to a URL. At 914 the web page is displayed for the user to save the URL of 912. At 916 the user, at a later time, accesses the saved URL of 914. At 918, in response to the user again accessing the URL at 916, the database is again searched (looping back to 908) for the SalesChip/RSE unique record Identifier. At 920 the updated data in database 908 from the 918 loop back is again copied to a URL. At 922, the user is redirected to the updated URL of 920.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

For example, another possible implementation includes representing an Identifier as an SMS ID on a mobile phone platform; the SMS ID would be keyed in on a mobile phone and submitted over the cellular network to a handler application which would return a search result set in a compatible format. The result set could be anything based on the search the user previously composed, such as a list of movies playing in the user's neighborhood or sports scores for New York teams. This is but one example of one possible use of the present invention.

Another aspect of the present invention, is embodied as a "Sales-Chip Relevance Alert" ("SCRA") 1000, see generally FIGS. 10-21. The Alert 1000 extends the capability of the SalesChip/RSE (regenerating search engine) by allowing users to become informed about relevant information that has changed to a query or search request. The Alert 1000 provides a timely notice to the user about the relevant information change. The user wholly controls how relevance is determined, the frequency for which the user is notified and at which a query or search request is re-executed, and a look back period for which a second, subsequent or present result has changed from a first result, initial result or prior result of a first, initial or prior inquiry point. The user can therefore narrowly and specifically describe, with a high degree of precision, what is relevant and meaningful to the user. As a result, the user is being notified about relevant changes or, change results, that were specifically defined by the user. The Alert 1000 also provides the user with a mechanism to edit or execute the Alert. At all times, the user will have control over management elements that drives the invention so that relevance and timeliness can also be user-defined.

Sales-Chip Relevance Alert Management Elements

Figure 18:
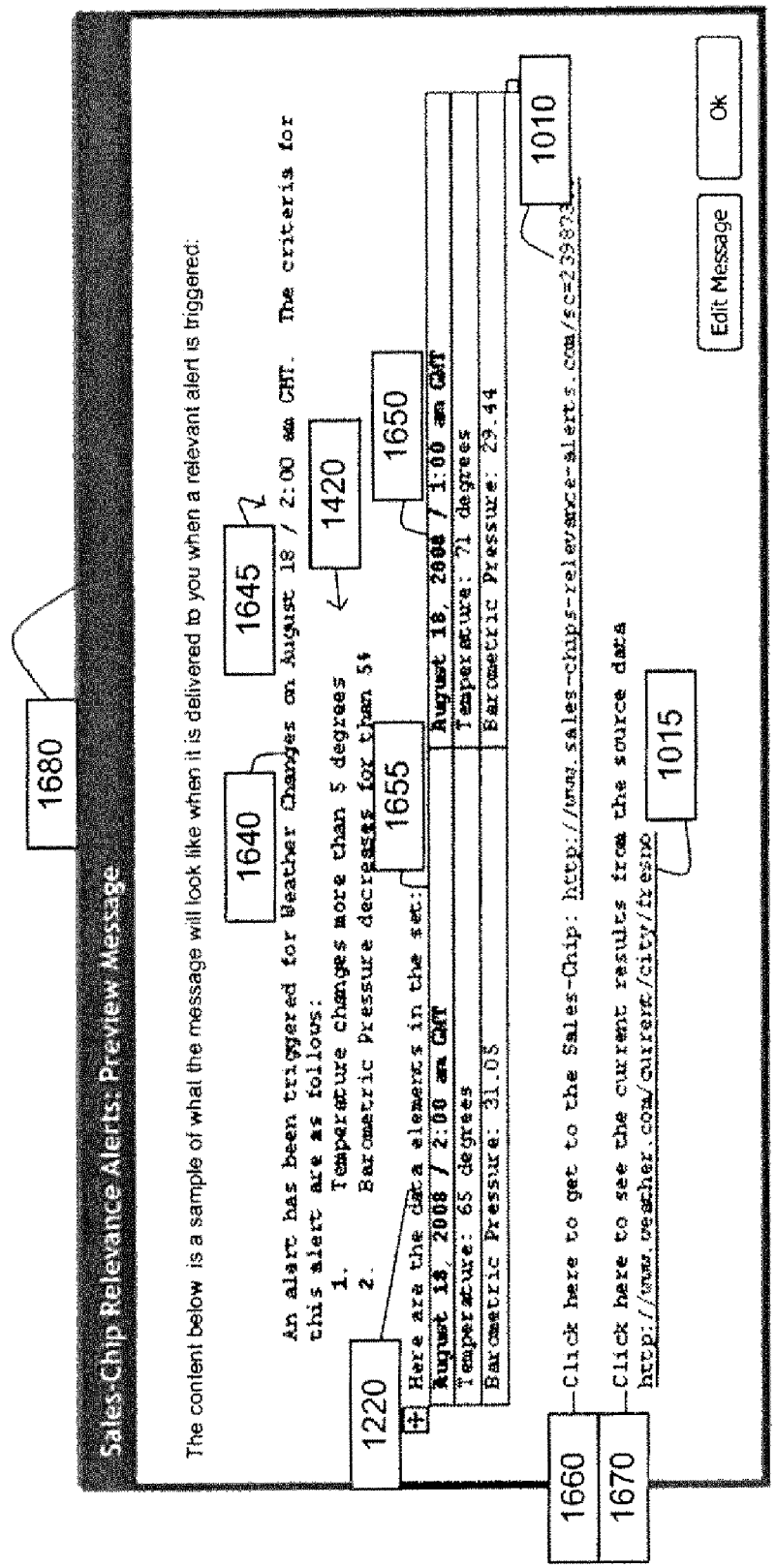
FIG. 18 is a ninth screen shot showing a graphical user interface of an Alert embodiment of the subject invention.

The Sales-Chip Relevance Alert is represented by a single Uniform Resource Identifier 1010 or URI, which is often called a URL or hyperlink, See FIG. 18. The Identifier encapsulates all management elements and information supplied by the user to the management elements. The management elements of the Alert 1000 include a Sales-Chip Editor 1200, a Look Back Manager 1300, a Relevance Manager 1400, a Notification Manager 1500 and a Content Editor 1600. Each management element will be discussed in detail herein below. The identifier 1010 can conveniently bring back the management elements so that management information can be user-modified or the Alert 1000 can be executed on-demand. The Sales-Chip Relevance Alert 1000 also allows for the original SalesChip/RSE to be run against a source data or information source 1015 such as a repository to a single website or a plurality of websites.

Sales-Chip Editor

The Sales-Chip Editor element 1200 scans the information source 1015 for an underlying query, such as a specific SalesChip/RSE, and returns a result set. The result set of the query always provides for at least one data element. The result set can be organized and categorized into data elements. The Sales-Chip Editor permits the user to select data elements deemed important or relevant to the user, on which the user desires notifications. Accordingly, the data element information can be formatted and further analyzed based on the desire of the user. As an added feature of the Sales-Chip Editor, each data element can be named or labeled by the user. The Sales-Chip Editor has a mechanism to connect to information source 1015 so that the underlying query can be performed repeatedly based at a user-defined frequency.

Look Back Manager

The Look Back Manager element 1300 allows the user to describe an interval between execution of a first, initial or prior inquiry and a second, subsequent or present inquiry, also called a re-execution. Here, the user can describe any time period in which to compare and create the change set or change result. Accordingly, the user can define the Look Back Manager to set a time schedule after the first inquiry for the second or subsequent inquiry to be run.

The Look Back Manager element 1300 also takes the result set from the first query generated by the Sales-Chip Editor and compares it to the second inquiry's result set of the same Sales-Chip Editor query. Any differences between the two results sets are represented a change set or change result. For instance, the change result can be newly added information from the database. Thus, the change set or change result represent the difference between past, first, initial or prior measured (or captured) information and the latest, second, subsequent or present measured (or captured) information. In one instance, if the user has defined relevance as being when a change result occurs, then the Alert 1000 can issue a notification to the user. In another instance, the user defines what is required in the change result in order for it to be relevant before the user is notified about the change result. Another feature of the Look Back Manager element 1300 is that it serves as a database to store all result sets of any query run. The database feature of this Look Back Manager element 1300 allows comparisons to be made between a current query and a prior result set or between two result sets.

Relevance Manager

The Relevance Manager element 1400 allows the user to filter the change set or change result and/or data element returned by the Look Back Manager 1300 and the Sales-Chip Editor 1200. Here, the user defines or describes criteria elements being features or characteristics of the data elements. These criteria elements are used to focus the Alert 1000 based on the feature or characteristic of the data element selected by the user to define relevance. The Relevance Manager element provides a means to describe multiple criteria elements across all available data elements of the Sales-Chip Editor. When the criteria elements exist, a match is obtained. Or, stated otherwise, a match is present when the change set or change result is compared to the criteria element and a response is true. The Relevance Manager may employ comparators 1410, 1420, 1430 including terms such as "and", "or", "greater than", "less than", "equals", etc.

Notification Manager

The Notification Manager element 1500 serves to inform the user when the match is present. The Notification Manager allows the user to define the rules for where and how to send a notification alert. The notification alert is dispatched when an Alert Processor, discussed below, finds the match. Or, stated otherwise, when a comparison in the Relevance Manger results in a true match, the notification alert or message must be released. The user can select to be informed through email or other electronic distribution mechanisms, such as TV or radio channel. This element, like all elements of the Alert 1000, is user-controlled giving the user the ability to decide how the user is notified. As a further embodiment, the user may receive a notification and translate that into a "doing work" command such as turning on water for a home sprinkler or other commands, if the user's preferences dictate that measured change call for indicated action.

Content Editor

The Content Editor element 1600 provides user-edited message templates that form the notification alert that is sent to the user by the Alert Processor when a match is present. The template contains the future content of the message or notification alert that is sent including freeform text, HTML and variables that can be incorporated in the template message. The user-defined template is created and stored in the Content Editor. Variables that can be included in the template comprise data element variables and criteria element variables. The variables in the template serve as place holders that can be replaced with actual data from the query run by the Sales-Chip Editor and processing during run-time.

The following non-limiting example shall serve to illustrate the "Sales-Chip Relevance Alert" 1000 embodiment of the present invention. This example shows a user setting up a "Sales-Chip Relevance Alert" 1000 for the first time using a user interface such as a Wizard.

EXAMPLE

A user is interested in knowing when specific changes in the weather occur. The user specifically wants to find out when temperature has dropped by more than 5 degrees Fahrenheit as well as the barometric pressure has dropped by more than 5%, in the Fresno, Calif. area between any hours of the day.

Figure 10:
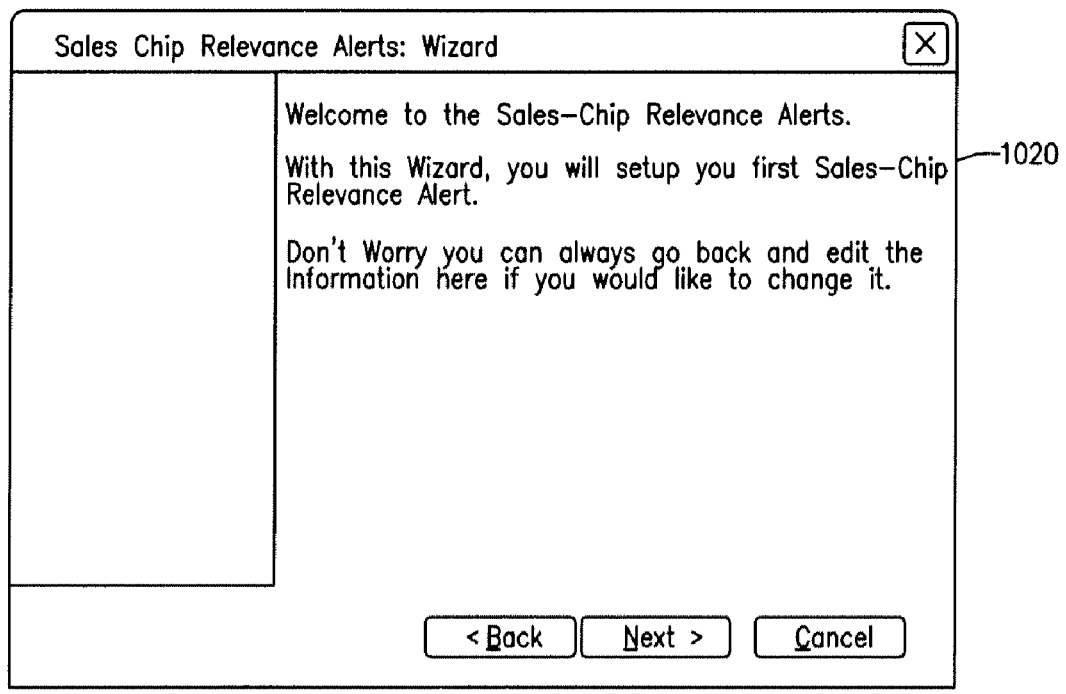
FIG. 10 is a first screen shot showing a graphical user interface of an Alert embodiment of the subject invention.
Figure 11:
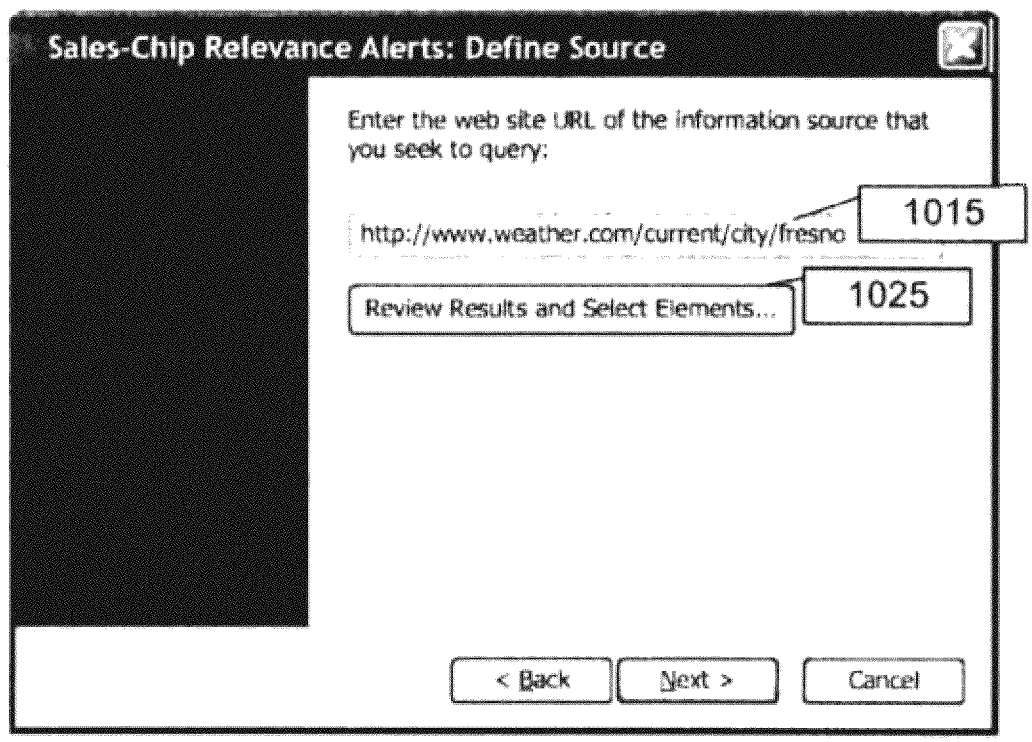
FIG. 11 is a second screen shot showing a graphical user interface of an Alert embodiment of the subject invention.
Figure 14:
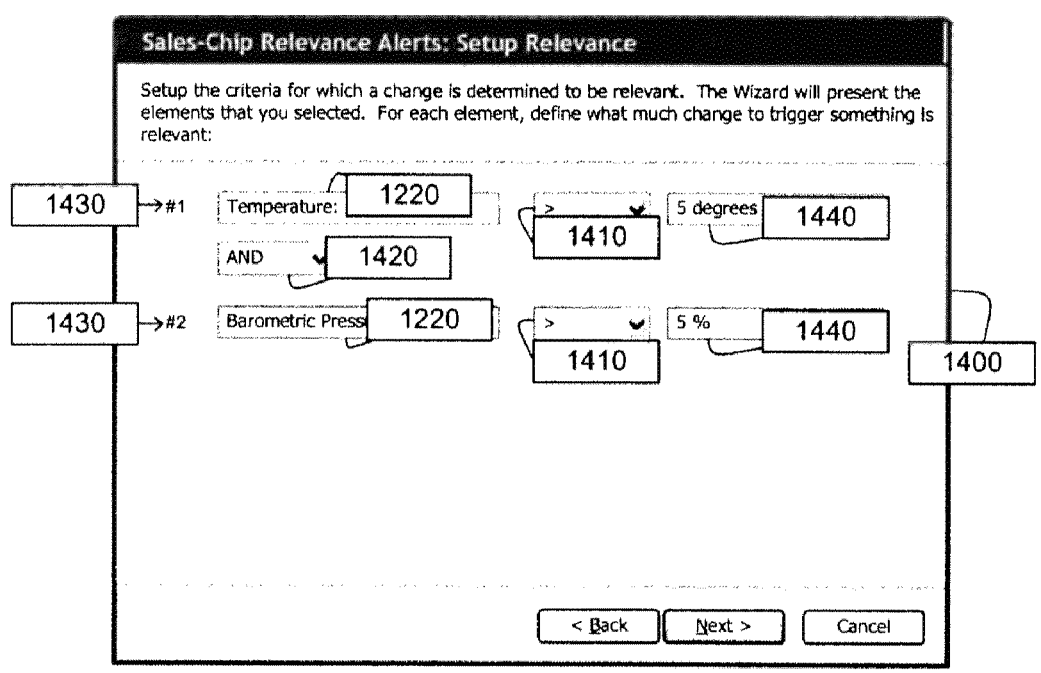
FIG. 14 is a fifth screen shot showing a graphical user interface of an Alert embodiment of the subject invention.

The user sets up an Alert 1000 via a user interface or wizard 1020, see FIG. 10 be given the opportunity to control each management element within the Alert 1000. The user first defines the source by entering the web site identifier 1010 of the information source 1015 they seek to query, see FIG. 11. Here, the user is also given the option to "Review Results and Select Elements" by clicking on button 1025. This option maybe employed when a user wants to edit one or more management elements within the Alert 1000 regardless of whether the Alert 1000 is pre-existing or has just been created.

Here, since the user is setting up an Alert 1000 for the first time, button 1025 is not selected and the user is taken directly to the Sales-Chip Editor element 1200. Here the user can view all data elements 1220 in a result set 1210 and then select the data elements 1220 of interest to the user. Under the Sales-Chip Editor element 1200, the user is also given the option to name the data element for future reference. Here, the user selected two data elements 1220 to focus on, pressure and temperature, and named them barometric pressure and temperature, respectively.

After selecting the data elements 1220, the user selects the frequency for executing the query using the Look Back Manager element 1300, see FIG. 13. The user selects frequency elements 1310 to define when the query should start, end and how frequently the query should be performed. Here, the user has selected the query to start at 8:00 a.m. on Aug. 1, 2008, and run every hour, daily with no end date. See FIG. 13. The next element the user can manipulate is the Relevance Manager element 1400, see FIG. 14.

Under Relevance Manager 1400, the user defines relevance of data elements and even the relevance of a change set or change result. Relevance is determined by defining criteria elements 1430 and using comparators 1410, 1420, 1440. Comparators 1410, 1440 define the relevant change with respect to the data elements 1220 of temperature and barometric pressure, while the comparator 1420 defines the relevance between the two data elements 1220. Here, the user has defined two criteria elements 1430 for the present Alert 1000. The first criteria element defines the temperature data element 1220 and uses the comparator 1410 of greater than to define relevance when the temperature has changed greater than five degrees. The second criteria element defines the barometric pressure data element 1220 and also uses the greater than comparator 1410 to define relevance when the pressure has changed greater than five percent. The "and" comparator 1420 between the two criteria requires both criteria elements 1420 to be met or present before a match is triggered. If the user had selected "or" as the comparator 1420, then a match or relevance would be met when either the temperature changed more than five degrees or the barometric pressure changed more than five percent.

Figure 15:
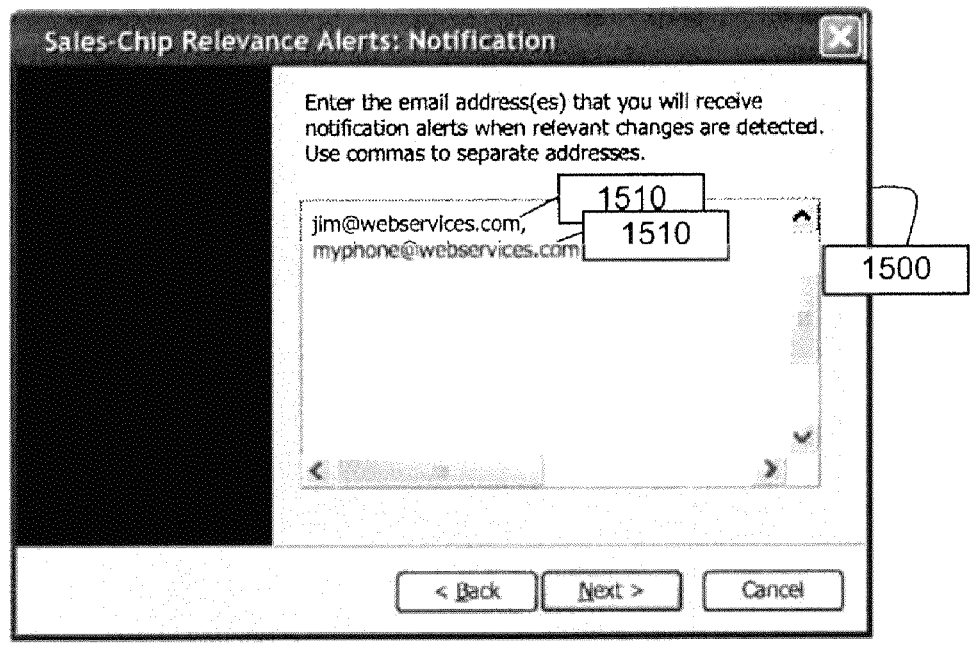
FIG. 15 is a sixth screen shot showing a graphical user interface of an Alert embodiment of the subject invention.
Figure 16:
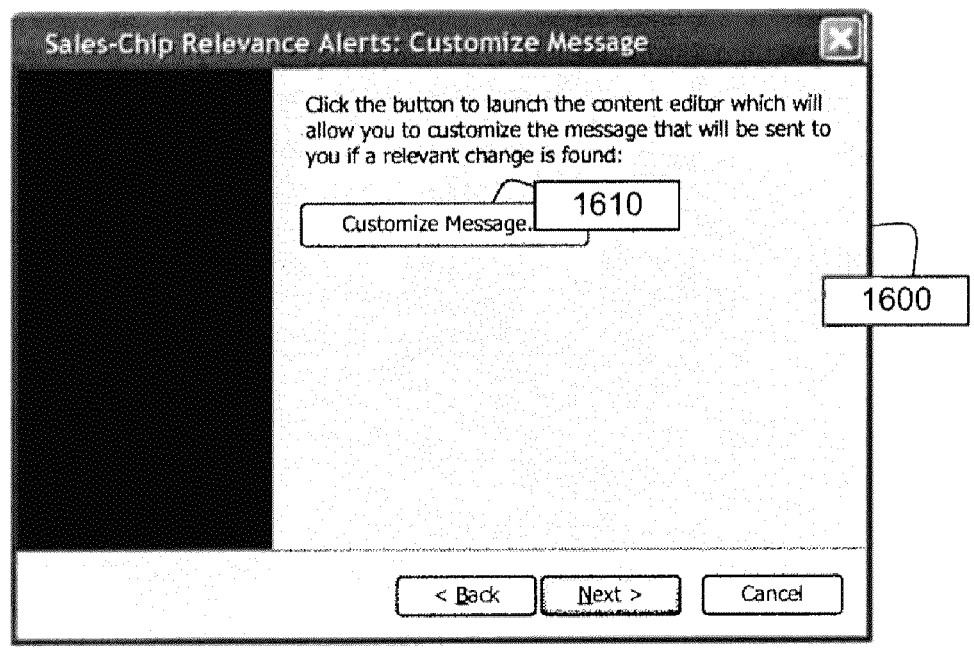
FIG. 16 is a seventh screen shot showing a graphical user interface of an Alert embodiment of the subject invention.
Figure 17:
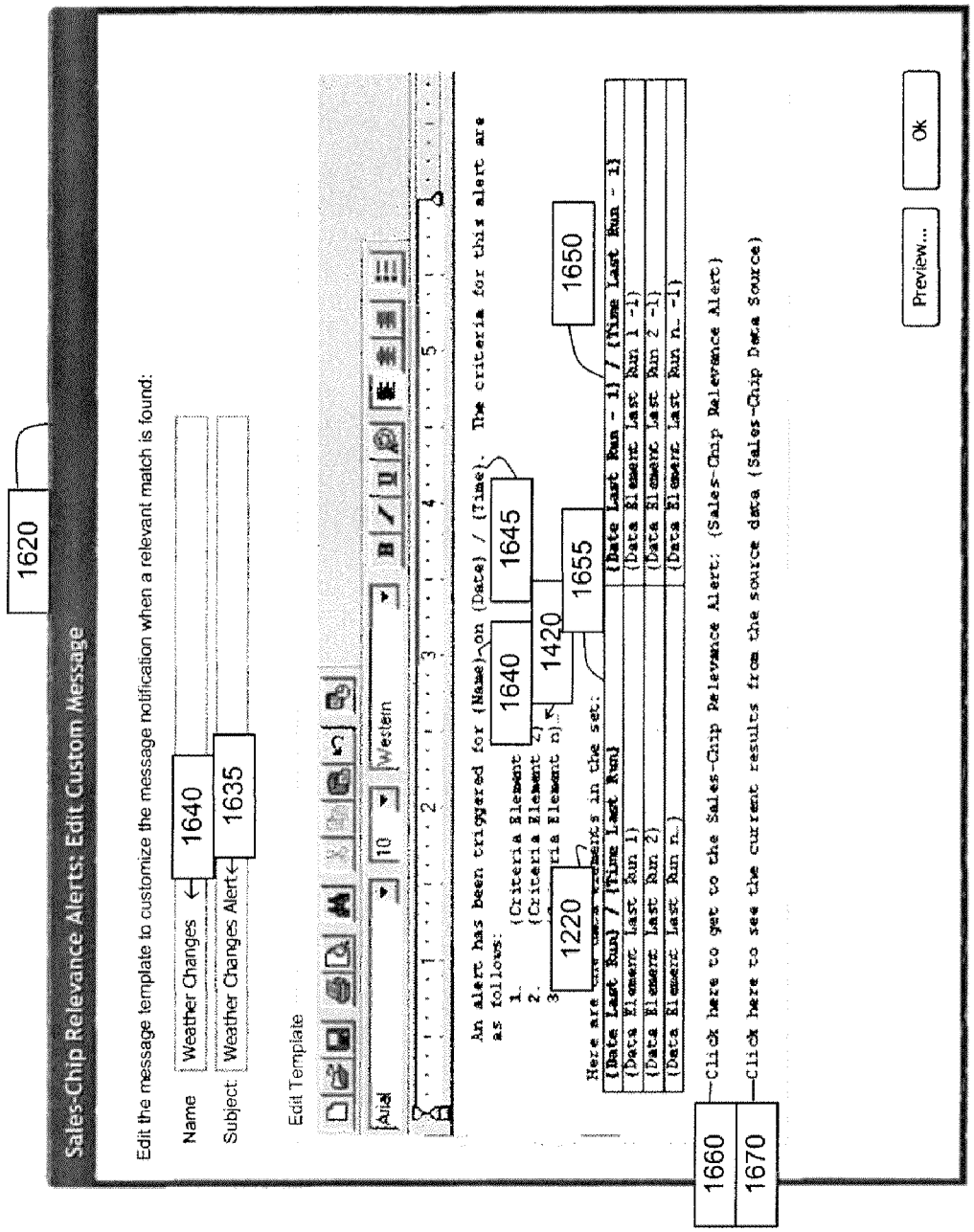
FIG. 17 is a eighth screen shot showing a graphical user interface of an Alert embodiment of the subject invention.

When relevant changes are detected, the user can define where notification alerts can be sent using the Notification Manager 1500, see FIG. 15. Here, the user selected two email addresses 1510 to receive the notification message. The user then can customize or edit message using the Content Editor Manager 1600. The screen shown at FIG. 16 shows the user interface for the Content Editor Manager 1600. By clicking the "customize message" button 1610, the user is taken to message template 1620 screen, see FIG. 17.

Using the message template 1620, the user defines the name 1640 and subject 1635 of the message template 1620 and views the variables within the body of the notification alert. The variables include the name 1640, date and time 1645, the criteria elements 1420 defined under the Relevance Manager 1400, and place holders 1650, 1655 for data elements. The message template 1620 also offers the user the opportunity to get to the Sales-Chip Relevance Alert 1000 at field 1660 by providing a variable field for the identifier 1010 and to see the current results at field 1670 by providing a variable field for the information source or source data 1015.

FIG. 18 shows a preview screen 1680 of the message created by the user. The message shows the Alert was triggered for weather changes 1640 on August 18 at 2:00 a.m. GMT for the listed criteria elements 1420. The message also replaces the place holders 1650, 1655 with data element 1220 information. The place holder 1650 shows the actual data or results from a first, previous or initial query executed on August 18 at 1:00 a.m. GMT and place holder 1655 inserts the data or results from a subsequent, second or present query executed on August 18 at 2:00 a.m. GMT. At field 1660, the user is shown the identifier 1010 to be able to get to the Alert 1000 and at field 1670 the source data 1015 to be able to view current results from the source data. At this point, a URL 1010 is associated with the Sales-Chip Relevance Alert 1000. In the present example the URL 1010 associated with the present Alert 1000 is: http://www.sales-chips-relevance-alerts.com/sc=23987333, see FIG. 18. The URL 1010 allows the user to convenience of being able to embed the URL on a web page, or in an email message to access the Alert 1000. As mentioned above, when the URL 1010 is selected after this initial set up time, the user can re-enter the Alert 1000 and edit all management elements in the Alert 1000 or execute services.

Figure 19:
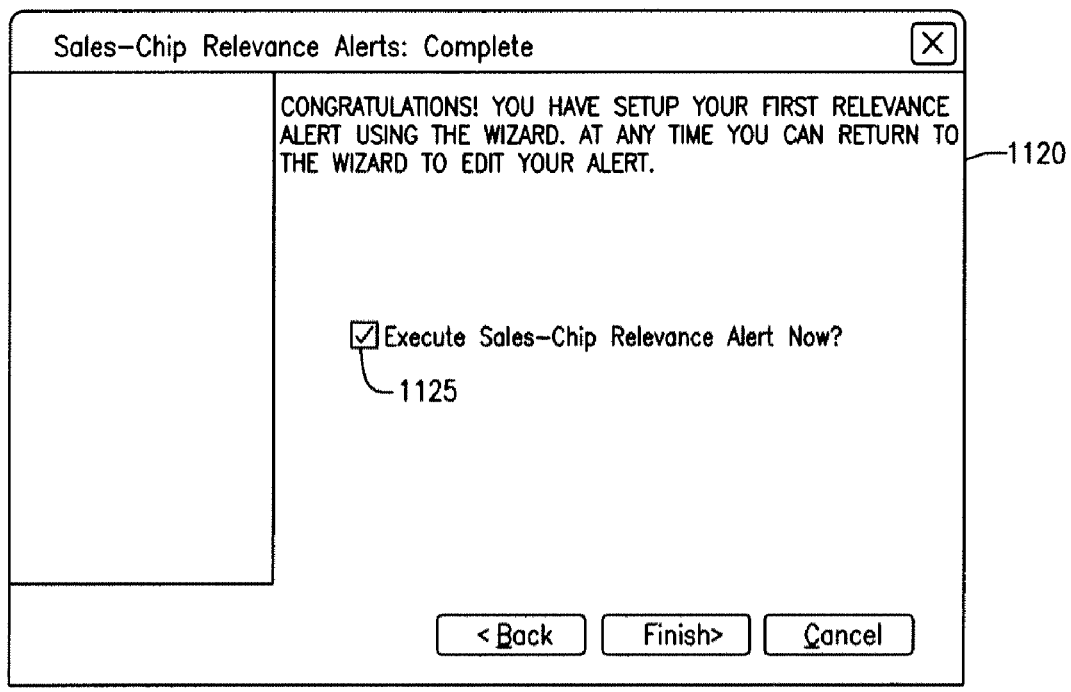
FIG. 19 is a tenth screen shot showing a graphical user interface of an Alert embodiment of the subject invention.

Screen 1120 on FIG. 19 shows the user interface indicating to the user that the set up of the Sales-Chip Relevance Alert 1000 is complete, at the same time the Alert 1000 can be saved. The user is also offered the chance to return to the wizard 1020, see FIG. 10, to edit or execute 1125 the Sales-Chip Relevance Alert 1000. Thereby the Alert 1000 is under total user control at any time, either when the alert 1000 is made or after it is made. Here the original alert 1000 is saved as well as the modified alert 1000.

Sales-Chip Relevance Alert Execution Services

The management elements of the Sales-Chip Relevance Alert 1000 is implemented using execution services. These execution services carry out the Sales-Chip Relevance Alert to determine if a match has occurred and provide notification to the end user. Therefore, the execution services perform the work of inspection, analysis, notification, and distribution. The execution services include a Frequency Processor, a Handler Processor, an Alert Processor and a Content Generator.

Frequency Processor

The Frequency Processor service holds all the Sales-Chip Relevance Alerts that have been defined by users. Each one of the Sales-Chip Relevance Alerts possesses information about the frequency for which queries must be run in order to determine if there are relevant changes. The Frequency processor scans the list of Sales-Chips Relevance Alerts and creates a queue of work that must be executed at the next scheduled run interval.

Handler Processor

The Handler Processor service does the majority of the work in the Alert 1000. The Handler Processor takes the queue of work items that are supplied by the Frequency Processor and performs Sales-Chip queries as defined within Sales-Chips Relevance Alerts 1000. The Handler Processor also compares information in older result sets that were managed and saved by the Look Back Manager with the criteria elements 1430 that was managed in the Relevance Manager 1400 and determines if there is a match. If there is a match, Handler Processor will collect the match information and hand it to the Alert Processor. In all cases, the result set for each executed Sales-Chip query is recorded to facilitate review at the next specifically defined run interval.

Alert Processor

The Alert Processor service is responsible for producing a notification Alert to the user. The Alert Processor uses the rules stored by the Notification Manager 1500 to determine where and how to send the notification alert. The Alert Processor utilizes the services of the Content Generator service, discussed below, to package the exact notification message that will be sent to the user.

Content Generator

The Content Generator service is called by the Alert Processor service to create a message or notification alert. The notification alert is created using both user-defined input from the template 1620 created in the Content Editor element 1600 and execution service input such as the match information generated by the Handler Processor. The result is a message or notification alert that will be passed to the user via the Alert Processor.

On-Demand Service

As a further embodiment, the Alert 1000 may be able to run in an "On-Demand" mode 1700. In this instance, the user is interacting with the Alert 1000 rather than having the Alert 1000 run completely automated via Execution Services 1200-1600 as described above. Unlike the scheduled execution of the Alert 1000, the On-Demand service 1700 works to produce results based upon the instantaneous request of the user. Another key feature of On-Demand service is that the user can specify the time frame for the look back manager 1300 to make comparisons based on records already stored in the look back manager 1300 database. The On-Demand service allows the user to see the results of the underlying queries via the screen and will come back with a "Match" or "No Match" status code. If a "Match" is found, the system will generate the message as described in the Execution Services section.

Figure 20:
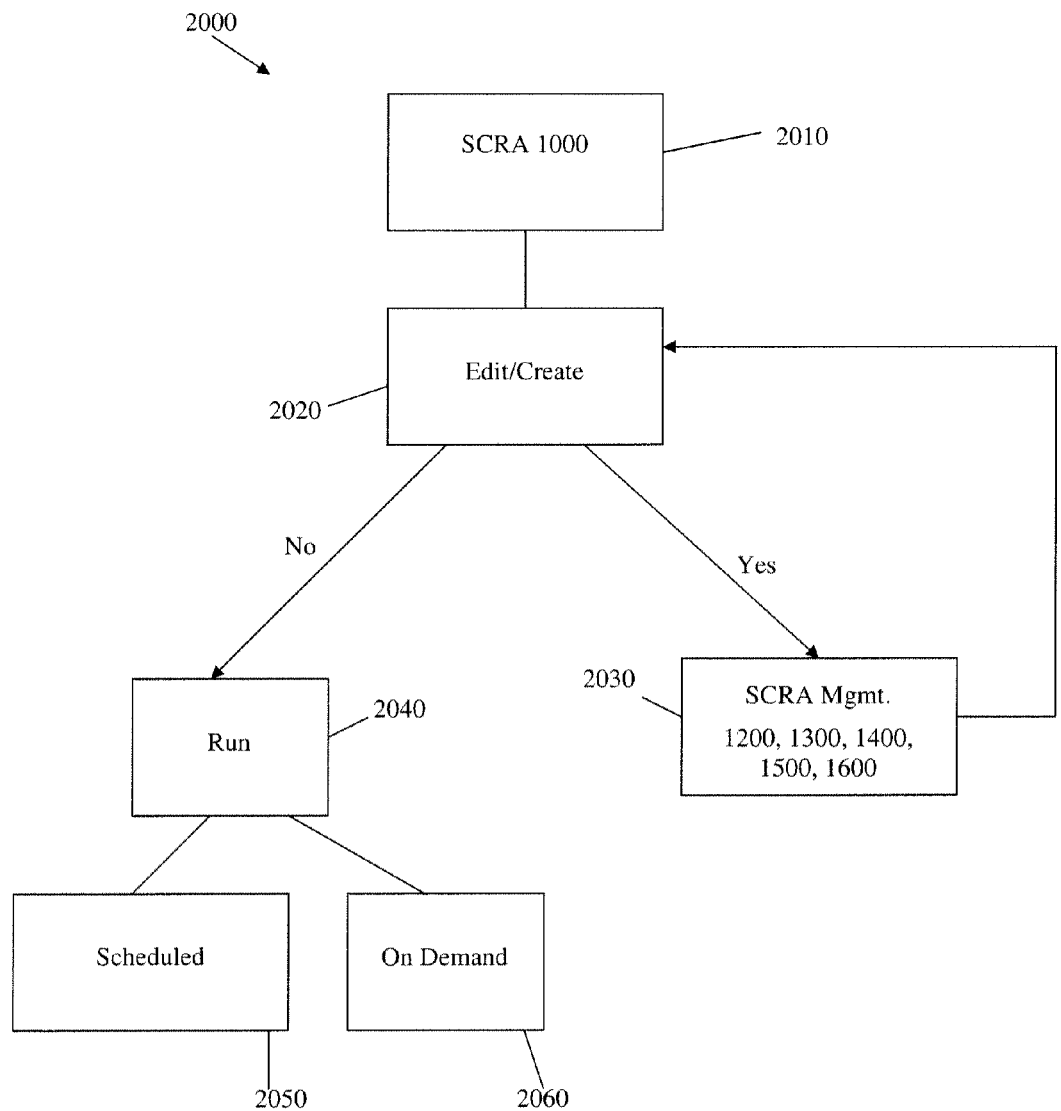
FIG. 20 is a flow chart of the logic process of an Alert embodiment of the subject invention.

Next, referring to FIG. 20, the logic process 2000 of the Sales-Chip Relevance Alert 1000 is shown. At 2010, the user enters the Sales-Chip Relevance Alert (SCRA) 1000 such as by using a wizard 1020, see FIG. 10. The user can then to decide to edit an existing Alert 1000 or create a new Alert at 2020. If the user elected to edit or create the Alert 1000, the user is taken to 2030 where the Sales-Chip Relevance Alert Management Elements, Sales-Chip Editor 1200, a Look Back Manager 1300, a Relevance Manager 1400, a Notification Manager 1500 and a Content Editor 1600, are provided to the user for manipulation. After each management element is modified the user is asked whether they are satisfied with their decision/edit by being looped back to 2020. Once the user is satisfied with the management elements 1200-1600, the user can opt not to edit or create the Alert 1000 and is taken to the option at 2040 to run or execute the Alert 1000. The execution may be performed as scheduled by the user at 2050 or On-Demand at 2060 using the on-demand service 1700 described above.

Figure 21:
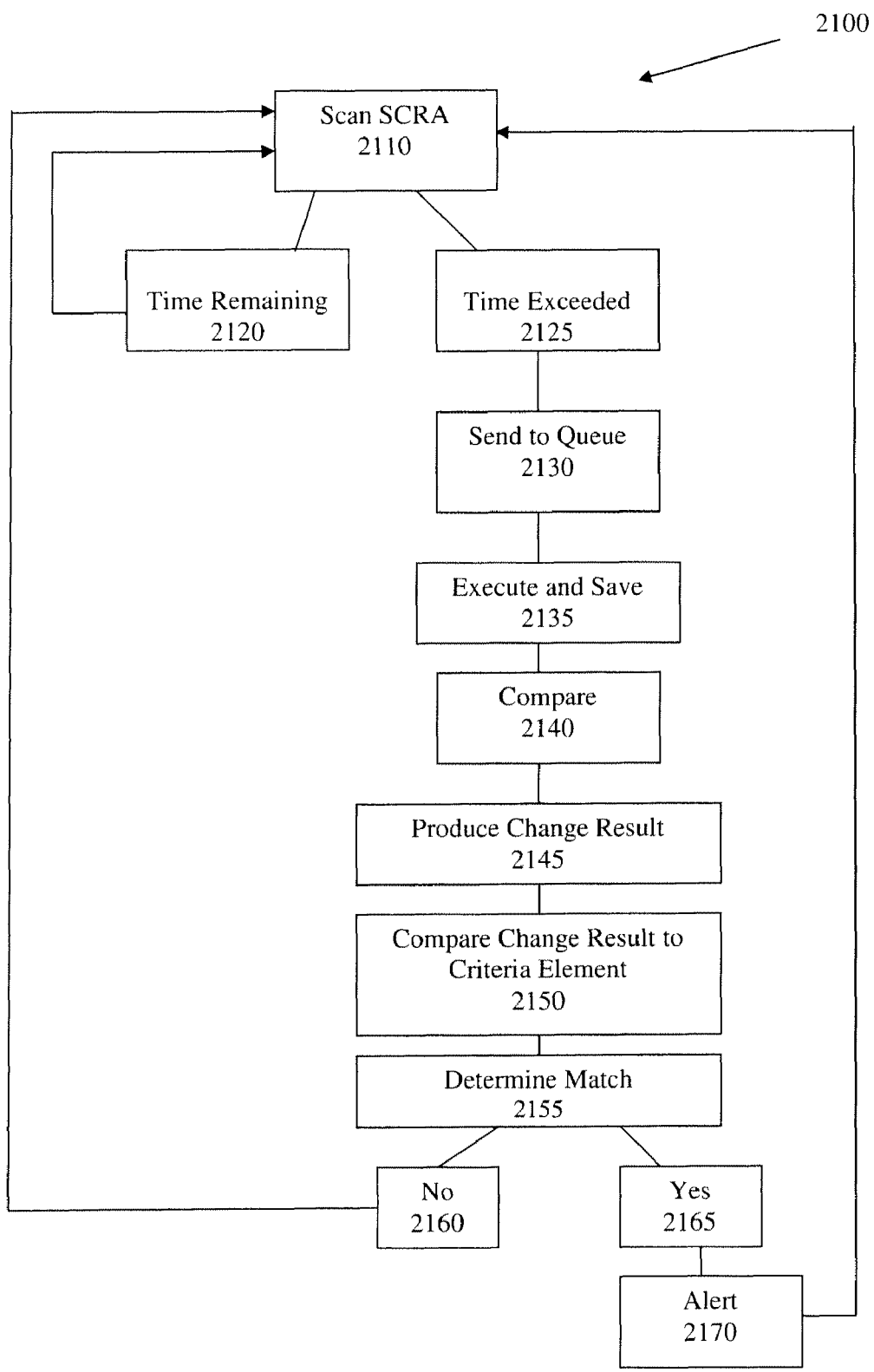
FIG. 21 is a flow chart of the software process of an Alert embodiment of the subject invention.

Next, referring to FIG. 21, the software process 2100 of the Sales-Chip Relevance Alert 1000 is shown. At 2100, the Frequency Processor service scans all Sales-Chip Relevance Alerts 1000 looking for the frequency defined in the Look Back Manager 1300 of each Alert 1000. If the Alert 1000 has time remaining at 2120 that specific Alert is looped back to 2110 where it will be scanned by the Frequency Processor again. If, on the other hand, time has exceeded at 2125 for an Alert 1000, the Frequency Processor sends the Alert to a queue 2130 and the Handler Processor takes the queued work item and performs Sales-Chip queries at 2135. The Handler Processor also compares information at 2140. At 2145 a change set or change result is produced from the comparison of 2140. The change result or change set is then compared to the criteria elements at 2150 if such criteria element has been user defined. At 2155 the Handler Processor then determines if a match is present. At 2160, if the match is not present a loop brings the Alert 1000 back to point 2100. At point 2165, if a match is determined to be present then a notification Alert is issued at the Alert 2100 the process then loops back to point 2100.

The invention claimed is:

1. A computer implemented method for notifying a search request user of user-defined relevant changes to personalized, modifiable and repeatable search requests on a database wherein said personalized search requests are repeated to access and retrieve newly added information from the database the method comprising the steps of:

executing at least one personalized, modifiable and repeatable search request on a component to obtain a first result from a database, said first result comprising characteristics;

determining whether said first result is successful, said determination of success being made by said search request user using said component;

saving each said personalized, modifiable and repeatable search as a search engine, said search engine being said personalized, modifiable and repeatable search request where said search request user has deemed said first result to be successful;

selecting one said saved search engine; and creating and saving an alert for said selected saved search engine, said alert indicating relevant information that has changed to said selected saved search engine, said alert comprising management elements including an editor and a relevance manager, said editor displaying said characteristics of said first result, said relevance manager providing comparators, said search request user selecting at least one said characteristic of interest to said search request user from said first result and at least one comparator, said selection made by the search request user forming an identifier, said identifier encapsulating said management elements and information supplied by the user to the management elements;

re-executing the selected saved search engine on the component to obtain a second result from the database, said second result being newly added information from the database;

determining a change result for the selected characteristic of said first result using the component, said change result being a difference between the first result and the second result;

defining at least one criteria element, said at least one criteria element filtering said change result based on said at least one characteristic of said first result, said at least one characteristic being of importance to the search request user, said filtering employing said at least one comparator of said relevance manager; and notifying said search request user using the component when the change result is relevant to the search request user, wherein relevance of the change result is defined by said alert.

2. The method of claim 1, wherein the step of re-executing the saved search engine is performed during a user-defined interval, said user-defined interval being user- modifiable at any time.

3. The method of claim 1, wherein the step of re-executing the saved search engine on the component is executed on demand by the search request user.

4. The method of claim 1, further comprising the step of determining a match between the change result and the at least one criteria element, wherein the search request user is notified when the change result is relevant to the search request user, specifically when the match is present.

5. A computer implemented method for notifying a search request user of user-defined relevant changes to personalized, modifiable and repeatable search requests on a database wherein said personalized search requests are repeated to access and retrieve newly added information from the database the method comprising the steps of:

executing at least one personalized, modifiable and repeatable search request on a component to obtain a first result from a database, said first result comprising characteristics;

determining whether said first result is successful, said determination of success being made by said search request user using said component;

saving each said personalized, modifiable and repeatable search as a search engine, said search engine being said personalized, modifiable and repeatable search request where said search request user has deemed said first result to be successful;

selecting one said saved search engine; and creating and saving an alert for said selected saved search engine, said alert indicating relevant information that has changed to said selected saved search engine, said alert comprising management elements including an editor, said editor displaying said characteristics of said first result, said search request user selecting at least one said characteristic of interest to said search request user from said first result, said selection made by the search request user forming an identifier, said identifier encapsulating said management elements and information supplied by the user to the management elements;

re-executing the selected saved search engine on the component to obtain a second result from the database, said second result being newly added information from the database;

determining a change result for the selected characteristic of said first result using the component, said change result being a difference between the first result and the second result; and notifying said search request user using the component when the change result is relevant to the search request user, wherein relevance of the change result is defined by said alert.

6. The method of claim 5, wherein the alert further comprises a time interval, wherein the step of re-executing the selected saved search engine is performed during said time interval, said time interval being user-defined and user-modifiable at any time.

7. The method of claim 5, wherein the step of re-executing the selected saved search engine on the component is executed on demand by the search request user.

8. The method of claim 5, further comprising the step of defining at least one criteria element, said at least one criteria element filtering said change result based on said at least one characteristic of said first result, said at least one characteristic being of importance to the search request user, said filtering employing at least one comparator of a relevance manager.

9. The method of claim 8, further comprising the step of determining a match between the change result and the at least one criteria element, wherein the search request user is notified when the change result is relevant to the search request user, specifically when the match is present.

10. The method of claim 5, wherein said alert is saved with a unique alphanumeric character sequence.

11. The method of claim 5, further comprising:

creating and saving a second alert, said second alert including other than said characteristic that was previously selected, said second alert being saved with a unique alphanumeric character sequence, wherein relevance of the change result is defined by said second alert and said notification being issued as a result of such relevance.

12. The method of claim 5, further comprising:

creating and saving a second alert, said second alert being a modification of the alert wherein said modification includes selecting at least one of said characteristic in addition to said characteristic that was previously selected, said second alert being saved with a unique alphanumeric character sequence, wherein relevance of the change result is defined by said second alert, and wherein said notification is issued as a result of such relevance.

13. The method of claim 5, wherein said notification is user customizable, said notification displaying said relevant change result including at least said first result and said second result.

14. The method of claim 13, wherein said alert can be accessed on demand from said notification.

15. The method of claim 13, wherein said search engine can be accessed on demand from said notification.

16. The method of claim 5, wherein said first result is obtained by re-executing the saved search engine on the component producing a re-obtained first result from the database, said re-obtained first result being original information from the database, said re-execution to re-obtain the first result being run as though the saved search engine had just been entered.

\* \* \* \* \*